(12) United States Patent
Islim et al.

(10) Patent No.: US 11,977,665 B2
(45) Date of Patent: May 7, 2024

(54) HARDWARE FOR END-TO-END COMMUNICATION PROTECTION IN ASIC

(71) Applicant: VEONEER US SAFETY SYSTEMS, LLC, Southfield, MI (US)

(72) Inventors: Haitham Islim, Canton, MI (US); John Fitzpatrick, Le Mesnil-le-roi (FR); Ron Wantuck, Ann Arbor, MI (US); James Gramenos, Bloomfield Hills, MI (US)

(73) Assignee: VEONEER US SAFETY SYSTEMS, LLC, Southfield, MI (US)

( * ) Notice: Subject to any disclaimer, the term of this patent is extended or adjusted under 35 U.S.C. 154(b) by 396 days.

(21) Appl. No.: 17/554,453

(22) Filed: Dec. 17, 2021

(65) Prior Publication Data

US 2023/0195944 A1  Jun. 22, 2023

(51) Int. Cl.
| | |
|---|---|
| G06F 21/76 | (2013.01) |
| G06F 13/42 | (2006.01) |
| G06F 21/64 | (2013.01) |
| H04L 12/40 | (2006.01) |

(52) U.S. Cl.
CPC .......... *G06F 21/76* (2013.01); *G06F 13/4282* (2013.01); *G06F 21/64* (2013.01); *H04L 12/40032* (2013.01); *H04L 2012/40215* (2013.01)

(58) Field of Classification Search
CPC ...... G06F 21/76; G06F 13/4282; G06F 21/64; H04L 12/40032; H04L 2012/40215
See application file for complete search history.

(56) References Cited

U.S. PATENT DOCUMENTS

| 6,516,259 | B2 * | 2/2003 | Morell ................. B60R 21/013 701/45 |
| 2003/0139866 | A1 * | 7/2003 | Frimberger ............ B60K 28/14 701/45 |
| 2006/0091652 | A1 * | 5/2006 | Munch ............. B60R 21/01564 280/735 |
| 2016/0082912 | A1 * | 3/2016 | Yoon ...................... B60R 21/01 701/45 |
| 2018/0237028 | A1 * | 8/2018 | Hammerschmidt ... G07C 5/008 |
| 2019/0207950 | A1 * | 7/2019 | Mohammed ............ H04L 63/14 |
| 2021/0089018 | A1 * | 3/2021 | Nordbruch ........ B60W 60/0015 |

* cited by examiner

*Primary Examiner* — Nimesh G Patel
(74) *Attorney, Agent, or Firm* — Maiorana Patent Law, PA

(57) ABSTRACT

An apparatus comprising communication logic and a memory. The communication logic may be configured to receive a data payload, validate the data payload, decode an instruction from the data payload, generate a bypass signal in response to the instruction and generate a remote signal in response to an arm signal. The memory may be configured to store configuration data and store status information. The bypass signal may be compatible with a safing block configured to provide one independent signal for an actuator. The communication logic may operate according to a pre-defined end-to-end communication standard. The configuration data may be configured to enable a selected profile for the pre-defined end-to-end communication standard. The safing block may be configured to pass through the bypass signal generated by the communication logic as the arm signal. The communication logic may receive the arm signal from the safing block.

17 Claims, 18 Drawing Sheets

US 11,977,665 B2

HARDWARE FOR END-TO-END COMMUNICATION PROTECTION IN ASIC

FIELD OF THE INVENTION

The invention relates to sensor systems generally and, more particularly, to a method and/or apparatus for implementing hardware for end-to-end communication protection in ASIC.

BACKGROUND

End-to-end (E2E) communication is an industry standard intended to protect the exchange of data between two devices (i.e., two ends of a communication link). E2E communication is commonly used in vehicles. Data is sent over a communication bus (i.e., a CAN bus) to enable various components of the vehicle to exchange information. Conventional implementations of E2E communication are performed through a microprocessor. One issue with implementing E2E through a microprocessor is a man-in-the-middle attack. There is a potential for the microprocessor to modify the data as the data is passed between the two ends. The request is generated from an external entity and is passed to a final destination through the microprocessor. There is no assurance that the microprocessor did not alter the data content before passing the data on to the final destination.

Vehicle systems implement complex and standardized signal deployment chains. Implementing an entirely new standard can be impractical. An implementation that can ensure that data has not been tampered with must also be compatible with signal deployment chains.

It would be desirable to implement hardware for end-to-end communication protection in ASIC.

SUMMARY

The invention concerns an apparatus comprising communication logic and a memory. The communication logic may be configured to receive a data payload from a bus, validate the data payload, decode an instruction from the data payload, generate a bypass signal in response to the instruction and generate a remote signal in response to an arm signal. The memory may be configured to store configuration data and store status information. The bypass signal may be compatible with a safing block configured to provide one independent signal for activating an actuator. Validating the data payload may ensure an integrity of the instruction received from a remote source. The communication logic may operate according to a pre-defined end-to-end communication standard. The configuration data may be configured to enable a selected profile from a plurality of profiles for the pre-defined end-to-end communication standard. The safing block may be configured to pass through the bypass signal generated by the communication logic as the arm signal. The communication logic may receive the arm signal from the safing block.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
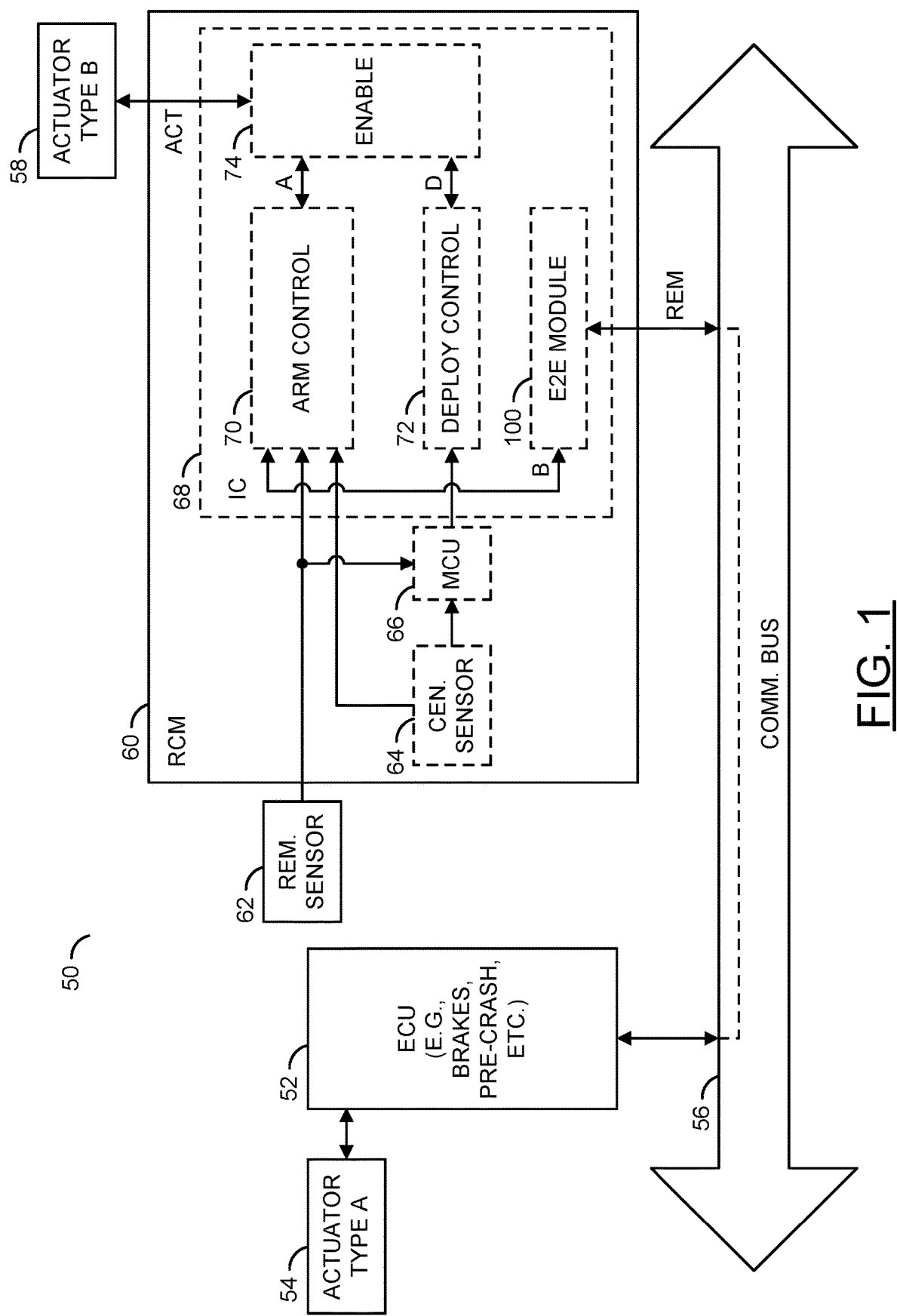
FIG. 1 is a diagram illustrating a system implementing an example embodiment of the present invention.

Embodiments of the present invention include providing hardware for end-to-end communication protection in ASIC that may (i) provide a configurable end-to-end arm status using two independent payloads, (ii) operate independently from a microcontroller, (iii) provide a parallel path for arming a deployment signal chain, (iv) be implemented within a restraint control module, (v) receive an arm request from a remotely located electronic control unit, (vi) snoop a status of a local arm signal, (vii) provide data for post-incident and pre-incident deployment, (viii) provide configuration registers, (ix) ensure data communicated has not been tampered with, (x) be implemented as a component of a vehicle, (xi) be compatible with signal deployment chains and/or (xii) be implemented as one or more integrated circuits.

Embodiments of the present invention may be configured to implement end-to-end (E2E) communication in hardware (e.g., using hardware logic). Implementing the E2E communication in hardware may enable the data transmitted using the E2E communication to be protected in hardware by removing a middleman component (e.g., a microprocessor). The hardware implemented E2E communication may support one or more profiles of the E2E standard. In an example, the hardware logic may be configured to implement a P1A and a P02 profile of the E2E standard. In some embodiments, the hardware logic implemented may be varied and/or expanded to support the various profiles of the E2E communication standard. The hardware logic may remove a possibility that a microprocessor has modified the data.

Embodiments of the present invention may implement the E2E hardware logic in an application specific integrated circuit (ASIC). The ASIC may enable the exchange of data from one end (e.g., one device in a vehicle) to another end (e.g., another device in the same vehicle) while ensuring protection of the data (e.g., the receiving device may have confidence that the data was not tampered with). The ASIC may be configured to protect the data exchange across a communication link (e.g., a CAN bus in a vehicle).

Since the hardware implementation of the E2 E communication may ensure that the data communicated may be trusted, various components of a vehicle may use the data with confidence. In one example, implementing the hardware E2E communication may enable remote deployment of a restraint system in response to an active safety system detecting a potential incident (e.g., a radar or computer vision system detecting an incident may communicate data to a deployment system) before the restraint system would normally be deployed (e.g., the active system may request deployment of the restraint system ahead of a triggering that may occur in response to physical impact detection sensors). In another example, a remotely located system may be activated in response to the deployment of a restraint system to implement a post-incident response (e.g., a deployment of a first system may cause the notification of a second system). The types of responses implemented may be varied according to the design criteria of a particular implementation.

Embodiments of the present invention may be configured to provide an E2E arm status. The E2E arm status may be an independent and parallel path for an arm control path. The E2E arm status may be provided using two configurable independent payloads. A microcontroller may not be able to alter the content of the payload between the two ends (e.g., the sender and the receiver). The E2E hardware may be configured to receive one external request for an arm status update using the configurable payload.

Referring to FIG. 1, a diagram illustrating a system implementing an example embodiment of the present invention is shown. A system 50 is shown. The system 50 may comprise components of an end-to-end communication. In the example shown, the system 50 may be implemented in a vehicle. For example, the system 50 may comprise a subset of components of a vehicle that may be communicating with each other using E2E communication. The system 50 may provide a high-level visualization of components used in E2E communication. For clarity, some components have been omitted.

The system 50 may comprise a block (or circuit) 52, a block (or circuit) 54, a block (or circuit) 56, a block (or circuit) 58, a block (or circuit) 60 and/or a block (or circuit) 62. The circuit 52 may implement an end device. The circuit 54 may implement an actuator. The circuit 56 may implement a communication bus. The circuit 58 may implement an actuator. The circuit 60 may implement a control module. The circuit 62 may implement a remote sensor. The system 50 may comprise other components (not shown). The number, type and/or arrangement of the components of the system 50 may be varied according to the design criteria of a particular implementation.

The end device 52 may be one end of communication for the E2E communication. In one example, the end device 52 may implement an electronic control unit (ECU). The end device 52 may be a remote device (e.g., located remotely from the E2E hardware logic, not integrated as part of a device that implements the E2E hardware logic, etc.). The end device 52 may be configured to receive data (e.g., from a sensor, from the bus 56, etc.). The end device 52 may be configured to generate one or more signals in response to data received. The end device 52 may comprise a control unit for a brake system, a pre-crash system, etc. The end device 52 may be configured to activate the actuator 54. The end device 52 may be compatible with one or more E2E communication profiles.

The actuator 54 and the actuator 58 may be configured to perform a physical action. The actuator 54 and the actuator 58 may be configured to perform an action in response to an input signal. The actuator 54 and the actuator 58 may comprise an interface between an electrical system (e.g., the ECU 52 or the control unit 60) and a mechanical system (e.g., a brake system, a steering system, an airbag system, a door lock system, a seating system, a seatbelt system, etc.). In the example shown, the actuator 54 may be a different type of actuator than the actuator 58. The types of actuators implemented for the actuator 54 and the actuator 58 may be varied according to the design criteria of a particular implementation.

The communication bus 56 may be configured to enable communication of data between two or more devices. In the example shown, the communication bus 56 may connect the end device 52 with the control unit 60. Generally, a number of devices and/or systems may communicate over the communication bus 56. In one example, the communication bus 56 may be a CAN bus of a vehicle.

The control unit 60 may be one end of communication for the E2E communication. The E2E hardware logic may be implemented in the control unit 60. In the example shown, the control unit 60 may implement a restraint control module (RCM). The control unit 60 may be configured to receive data (e.g., from a sensor, from the bus 56, etc.). The control unit 60 may be configured to generate one or more signals in response to data received. In one example, the control unit 60 may comprise a control unit for an airbag deployment system. The control unit 60 may be configured to activate the actuator 58.

The remote sensor 62 may implement one or more sensors. The remote sensor 62 may be configured to perform measurements (e.g., physical measurements) and convert the measurements into electronic data. The remote sensor 62 may be configured to communicate the data measured to the control unit 60 and/or other devices in the system 50. In one example, the remote sensor 62 may implement an acceleration sensor (e.g., implemented in the bumper to detect front impacts and/or implemented around the vehicle to detect side impacts). In another example, the remote sensor 62 may implement pressure sensors (e.g., implemented in the pillars of the vehicle to detect side events). The type of the remote sensor 62 implemented may be varied according to the design criteria of a particular implementation.

The control unit 60 may comprise a block (or circuit) 64, a block (or circuit) 66 and/or a block (or circuit) 68. The circuit 64 may implement central censors. The circuit 66 may implement a microcontroller. The circuit 68 may implement an integrated circuit (e.g., an ASIC). The control unit 60 may comprise other components (not shown). The number, type and/or arrangement of the components of the control unit 60 may be varied according to the design criteria of a particular implementation.

The central sensors 64 may comprise one or more sensors implemented on the control unit 60. For example, the central sensors 64 may be implemented on-board the control unit 60. The central sensors 64 may be configured to perform measurements (e.g., physical measurements) and convert the measurements into electronic data. The central sensors 64 may be configured to communicate the data measured to the microcontroller 66 and/or the ASIC 68. In one example, the central sensors 64 may implement a high G sensor (e.g., configured to measure an amount of force in a longitudinal and lateral directions for detecting front and side events). In another example, the central sensors 64 may implement roll sensors (e.g., configured to measure rollover events). The number and/or type of the central sensors 64 implemented may be varied according to the design criteria of a particular implementation.

The microcontroller 66 may be configured to receive data, perform calculations in response to the data received and/or generate signals. The microcontroller 66 may be configured to receive data from the remote sensors 62 and the central sensors 64. The microcontroller 66 may be configured to make determinations in response to the data received from the remote sensors 62 and/or the central sensors 64. The microcontroller 66 may be configured to receive data from the communication bus 56.

The ASIC 68 may comprise hardware logic for deploying the actuator 58 and the E2E hardware logic. The ASIC 68 may be configured to receive data and/or signals from the communication bus 56, the remote sensors 62, the central sensors 64 and/or the microcontroller 66. The ASIC 68 may be configured to determine whether to activate (e.g., deploy) the actuator 58. By implementing the E2E hardware logic, the ASIC 68 may be further configured to communicate a deployment status of the actuator 58 to the communication bus 56. The deployment status of the actuator 58 may be communicated to the end device 52.

The ASIC 68 may comprise a block (or circuit) 70, a block (or circuit) 72, a block (or circuit) 74 and/or a block (or circuit) 100. The block 70 may implement an arm control path. The block 72 may implement a deploy control path. The block 74 may implement activation enable circuitry. The block 100 may implement an E2E module. The ASIC 68 may comprise other components (not shown). The number, type and/or arrangement of the components of the ASIC 68 may be varied according to the design criteria of a particular implementation.

The arm control path 70 (e.g., a safing block) may be configured to generate a signal (e.g., A). The signal A may be an arm signal. The arm control path 70 may be configured to trigger the arm signal A in response to one or more of an input from the remote sensors 62, an input from the central sensors 64 and/or a signal (e.g., B) from the E2E module 100. The arm control path 70 may operate independent from the deploy control path 72 and the microcontroller 66.

The deploy control path 72 may be configured to generate a signal (e.g., D). The signal D may be a deploy signal. The deploy control path 72 may be configured to trigger the deploy signal D in response to an input from the microcontroller 66. The microcontroller 66 may activate the deploy control path 72 in response to performing calculations on data from the remote sensors 62 and/or the central sensors 64. For example, the microcontroller 66 may use the remote sensors 62 and/or the central sensors 64 for deployment decisions. The deploy control path 72 may operate independent from the arm control path 70 and the E2E module 100.

The arm control path 70 and the deploy control path 72 may rely on similar data (e.g., data from the remote sensors 62, the central sensors 64 and/or other data sources) to determine whether or not to generate the arm signal A or the deploy signal D. However, the arm control path 70 and the deploy control path 72 may each perform an independent analysis of the data. For example, even if the data analyzed is the same, the arm control path 70 and the deploy control path 72 may reach a different conclusion on whether or not to enable a deployment. The decision to generate and/or update the arm signal A may be determined independent from the decision to generate and/or update the deploy signal D.

The activation enable circuitry 74 may comprise logic configured to activate (e.g., deploy) the actuator 58. The activation enable circuitry 74 may be configured to generate a signal (e.g., ACT). The signal ACT may activate the actuator 58. The signal ACT may be generated in response to the arm signal A generated by the arm control path 70 and the deploy signal D generated by the deploy control path 72. The signal ACT may not be generated unless both the arm signal A and the deploy signal D have been received by the activation enable circuitry 74. Since the arm control path 70 and the deploy control path 72 operate independent from each other, the signal ACT may not be generated without independent confirmation for activation by both the arm control path 70 (e.g., the reception of the arm signal A) and the deploy control path 72 (e.g., the reception of the deploy signal D). For example, the deployment of the actuator 58 may only be performed in response to at least the system ASIC signal chain (e.g., the arm signal A) and the signal chain for the microcontroller 66 (e.g., the deploy signal D). In some embodiments, additional layers of conditions (e.g., protection) may be implemented before the deployment of the actuator 58 is enabled. The activation enable circuitry 74 may ensure that it is impossible for either the arm control path 70 or the deploy control path 72 alone to achieve deployment of the actuator 58.

The E2E module 100 may be a communication module. The E2E module 100 may be configured to implement hardware logic configured to perform E2E communication (e.g., a hardware component of the ASIC 68). The E2E communication performed by the E2E module 100 may be implemented according to a pre-defined E2E communication standard. The pre-defined standard may be integrated into the hardware of the E2E module 100. The E2E module 100 may be configured to send and/or receive a signal (e.g., REM). The signal REM may be a remote signal. The remote signal REM may be communicated over the communication bus 56. In some embodiments, the remote signal REM may comprise a request from the end device 52 (e.g., a request to activate the actuator 58). In some embodiments, the remote signal REM may comprise a request from the ASIC 68 to the end device 52 (e.g., a request to activate the actuator 54).

The E2E module 100 may be configured to send and/or receive the signal B. The signal B may be a bypass signal. The E2E module 100 may be configured to send/receive the bypass signal B to/from the arm control path 70. In some embodiments, the E2E module 100 may operate independent from (e.g., may not communicate with) the microcontroller 66 and/or the deploy control path 72. In some embodiments, the E2E module 100 may communicate with the microcontroller 66, but they microcontroller 66 may not modify the data communicated. Details of the E2E hardware logic implemented by the E2E module 100 may be described in association with FIGS. 7-8.

The E2E module 100 may be configured to enable communication between the control unit 60 and the end device 52 over the communication bus 56. The E2E module 100 may be configured to ensure that the data communicated between one end (e.g., the end device 52) and another end (e.g., the control unit 60) may be trusted with confidence (e.g., ensure the data has not been tampered with). For example, the E2E module 100 may enable the communication of data between the end device 52 and the control unit 60 to be communicated without the content of the data being modified by the microcontroller 66. In an example, a data payload may be passed to the microcontroller 66. The microcontroller 66 may transform the data payload from a CAN frame to another format (e.g., an SPI frame) without the microcontroller 66 touching the content of the data payload.

The trusted communication of data enabled by the E2E module 100 may allow data from the end device 52 to be used by the arm control path 70 for generating the arm signal A without passing the data (e.g., the content of the data payload) through the microcontroller 66. By excluding the microcontroller 66 from the decision making for activating the arm signal A, the ASIC 68 may preserve the independent decision paths of the arm control path 70 and the deploy control path 72. The E2E module 100 may enable the arm control path 70 to enable arming the actuator 58 based on an external request (e.g., the remote signal REM from the end device 52) in a pre-incident scenario. The E2E module 100 may be configured to snoop the status of the arm signal A. Based on the status of the arm signal A, the E2E module 100 may provide the remote signal REM externally (e.g., in a post-incident scenario).

The E2E module 100 may be configured to operate as part of the signal chain for the arm control path 70. The E2E module 100 may not operate as part of the signal chain for the deploy control path 72. Since the E2E module 100 works with the arm control path 70 but not the deploy control path 72, the E2E module 100 may preserve the independence between the arm control path 70 and the deploy control path 72. In an example of a pre-incident activation, the remote signal REM may be received by the E2E module 100 as a request from the end device 52. The E2E module 100 may generate the bypass signal B in response to the signal REM. The arm control path 70 may generate the arm signal A in response to the bypass signal B. The generation of the arm signal A alone may not be sufficient for the activation of the enable circuitry 74 to generate the activation signal ACT. The microcontroller 66 may independently activate the deploy control path 72 in order to generate the deploy signal D. In one example, the remote ECU 52 may also send a deploy request using the E2E communication that may be sent directly to the microcontroller 66 and the microcontroller 66 may further process and command the deploy control path 72 to generate the deploy signal D. Together, the arm signal A and the deploy signal D may enable the activation signal ACT.

The E2E module 100 may be configured to be implemented within the ASIC 68. The E2E module 100 may be implemented to improve the reliability and trust of data communicated between the ASIC 68 and other components in the system 50. The E2E module 100 may enable the arm signal A to be generated on demand (e.g., from an external component such as the end device 52) and provide the status of the arm signal A on demand. In one example, the E2E module 100 may be configured to support the generation of arm signals (e.g., via the signal REM based on the status of the arm signal A) that may be used by the end device 52 (e.g., such as a brake module). In another example, the E2E module 100 may be configured to support a reception of an arm request (e.g., via the signal REM) received from the end device 52 (e.g., such as an active control module) to support a remote deploy. The E2E module 100 may be configured to support pre-incident deployment, post-incident deployment, both pre-incident deployment and post-incident deployment and neither within the same circuit based on various configuration settings. The E2E module 100 may be configured to communicate the remote signal REM to/from the end device 52 over the bus 56, generate the bypass signal B in response to the remote signal REM (e.g., in a pre-incident scenario) and generate the remote signal REM in response to detecting the arm signal A (e.g., in a post-incident scenario). The bypass signal B generated by the E2E module 100 may be configured to be compatible with the arm control path 70. The bypass signal B may enable the E2E module 100 to cause the arm control path 70 to generate the arm signal A. The bypass signal B may be configured to ensure an independent and parallel path for the arm control path 70 to generate the arm signal A.

The ASIC 68 may be configured to generate the arm signal A and the deploy signal D independent from the E2E module 100. In all scenarios, the deploy control path 72 may generate the deploy signal D based on operations performed by the microcontroller 66 and without data from the E2E module 100. In one example scenario, the arm control path 70 may be configured to generate the arm signal A in response to data from the remote sensors 62 and/or the central sensors 64 without using data from the E2E module 100. In another example scenario, the arm control path 70 may be configured to generate the arm signal A in response to the bypass signal B generated by the E2E module 100 without using data from the remote sensors 62 or the central sensors 64. The E2E module 100 may operate as an independent entity from the microcontroller 66. The E2E module 100 may be configured as a parallel path for generating the arm signal A for the activation signal chain. For example, the ASIC 68 may be modified to support the E2E module 100.

Figure 2:
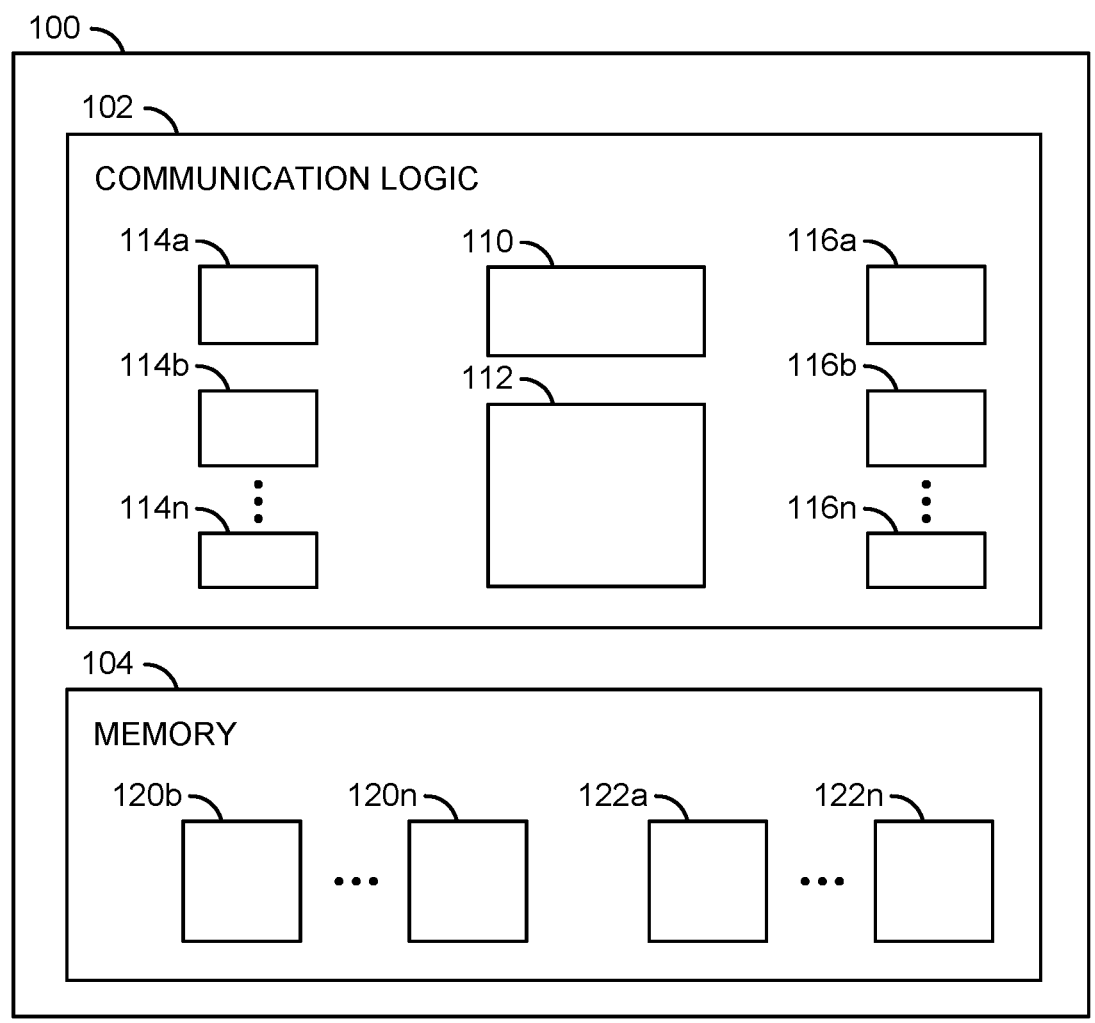
FIG. 2 is a diagram illustrating an example embodiment of the present invention.

Referring to FIG. 2, a diagram illustrating an example embodiment of the present invention is shown. A block diagram of the E2E module 100 is shown. The E2E module 100 may comprise a block (or circuit) 102 and/or a block (or circuit) 104. The circuit 102 may implement communication logic. The circuit 104 may implement a memory. The E2E module 100 may comprise other components (not shown). The number, type and/or arrangement of the components of the E2E module 100 may be varied according to the design criteria of a particular implementation.

The communication logic 102 may be configured to receive input and generate output according to the predefined E2E communication standard. The communication logic 102 may provide a communication interface. The communication logic 102 may be configured to receive an instruction and determine an integrity of the data in the instruction. Determining the integrity of the data in the instruction may ensure that the data being exchanged is usable and worthy to be able to provide a function that has been requested. Determining the integrity of the data in the instruction with respect to particular E2E communication profiles may ensure that the data communicated is compatible with the signal deployment chains of the vehicle.

The communication logic 102 may comprise a block (or circuit) 110, a block (or circuit) 112, blocks (or circuits) 114a-114n and/or blocks (or circuits) 116a-116n. The circuit 110 may implement a data validation block. The circuit 112 may implement a decoder (e.g., an opcode decoder). The circuits 114a-114n may each implement data extraction hardware logic. The circuits 116a-116n may each implement operation circuits. The communication logic 102 may comprise other components (not shown). The number, type and/or arrangement of the components and/or each type of component may be varied according to the design criteria of a particular implementation. Details of the data validation block 110, the opcode decoder 112, the data extraction logic 114a-114n and/or the operation circuits 116a-116n may be described in association with FIG. 7.

The memory 104 may comprise a register map. The register map 104 may be configured to store data for configuration of operational aspects of the E2E module 100 and/or store status information for the E2E module 100. The register map 104 may be configured to enable various profiles to be activated and/or deactivated for implementing the pre-defined E2E communication standard. The register map 104 may be configured to enable and/or disable various features of the E2E module 100.

The register map 104 may comprise one or more blocks (or circuits) 120a-120n and/or one or more blocks (or circuits) 122a-122n. The circuits 120a-120n may comprise configuration register sets. The circuits 122a-122n may comprise status register sets. The register map 104 may comprise other types of registers and/or storage devices (not shown). The number, type and/or arrangement of the registers and/or storage devices in the register map 104 may be varied according to the design criteria of a particular implementation. Details of the configuration register sets 120a-120n and/or the status register sets 122a-122n may be described in association with FIG. 8.

The data stored in the register map 104 may be used to determine the functionality of the E2E module 100. In one example, the functionality enabled by the E2E module 100 may comprise pre-incident and post-incident functionality. The E2E module 100 may be configured to enable and/or disable various different types of functionality. In one example, the E2E module 100 may be configured to enable the control unit 60 to operate with the register map 104 configured such that the reception of the arm request through the E2E module 100 is disabled and the transmission of the arm request through the E2E module 100 is disabled. In another example, the E2E module 100 may be configured to enable the control unit 60 to operate with the register map 104 configured such that the reception of the arm request through the E2E module 100 is enabled and the transmission of the arm request through the E2E module 100 is disabled. In yet another example, the E2E module 100 may be configured to enable the control unit 60 to operate with the register map 104 configured such that the reception of the arm request through the E2E module 100 is disabled and the transmission of the arm request through the E2E module 100 is enabled. In still another example, the E2E module 100 may be configured to enable the control unit 60 to operate with the register map 104 configured such that the reception of the arm request through the E2E module 100 is enabled and the transmission of the arm request through the E2E module 100 is enabled.

Figure 3:
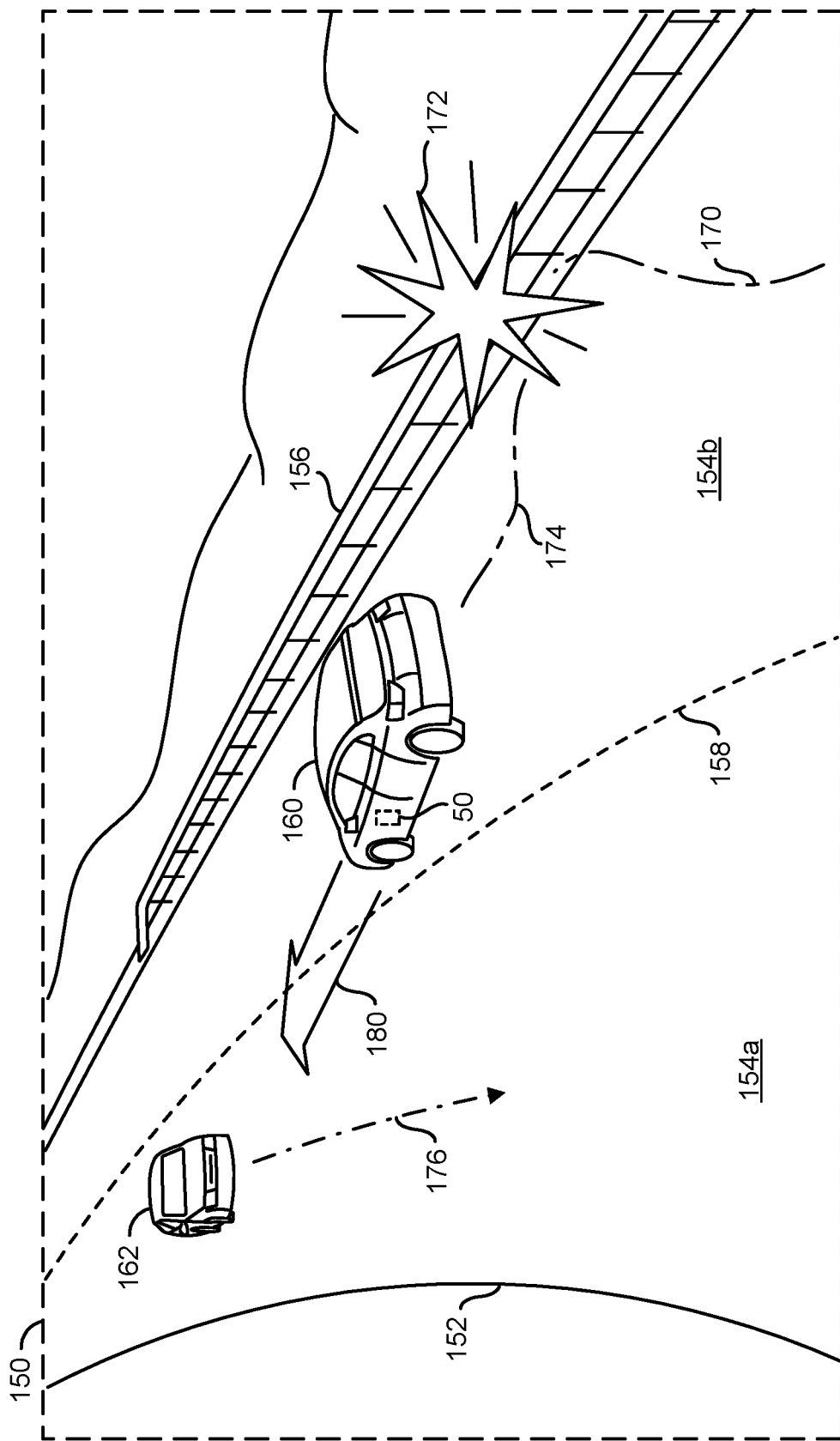
FIG. 3 is a diagram illustrating an example scenario for using built-in end-to-end communication protection in ASIC hardware for a signal chain to perform a post-incident activation.

Referring to FIG. 3, a diagram illustrating an example scenario for using built-in end-to-end communication protection in ASIC hardware for a signal chain to perform a post-incident activation is shown. An example scenario 150 is shown. The example scenario 150 may illustrate functionality enabled by the E2E module 100.

The example scenario 150 may comprise a road 152. The road 152 may comprise lanes 154a-154b. A guard rail 156 may be at the side of the road 152 next to the lane 154b. Lane markings 158 are shown separating the lane 154a and the lane 154b.

A vehicle 160 and a vehicle 162 are shown driving on the road 152. The vehicle 160 may be traveling in the lane 154b in an opposite direction from the vehicle 162 in the lane 154a. The vehicle 160 may implement the system 50 shown in association with FIG. 1. For example, the vehicle 160 may be an ego vehicle that implements the ASIC 68 and the E2E module 100.

The ego vehicle 160 may be in a post-incident situation. A dotted line 170, a symbol 172 and a dotted line 174 are shown behind the ego vehicle 160. The dotted line 170 may illustrate a path traveled by the ego vehicle 160. In the example shown, the path 170 may indicate that the ego vehicle 160 swerved towards the guard rail 156 (e.g., made an evasive maneuver, lost control due to driver error, lost control due to mechanical failure, etc.). The symbol 172 may represent an impact. The impact 172 may be a collision between the ego vehicle 160 and the guard rail 156. The dotted line 174 may illustrate a path traveled by the ego vehicle 160 after the impact 172. In the example shown, the path 174 may indicate that the ego vehicle 160 has moved away from the guard rail 156 after the impact 172. The path 170, the impact 172 and the path 174 may comprise the incident.

A dotted arrow 176 is shown extending from the vehicle 162. The dotted arrow 176 may represent a path traveled by the vehicle 162 in the lane 154a.

An arrow 180 is shown extending from the ego vehicle 160. The arrow 180 may illustrate a predicted path of the ego vehicle 160. In some embodiments, the predicted path 180 may be a path determined by an ECU of the system 50. In an example, the system 50 may implement an accelerometer, a gyroscope, a radar and/or computer vision. For example, the computer vision implemented by the system may determine, based on the path 174, that the ego vehicle 160 may continue to travel on the predicted path 180. However, in the scenario 150, the predicted path 180 is shown to indicate where the ego vehicle 160 may travel after the impact 172.

The predicted path 180 is shown crossing the lane markings 158. The predicted path 180 may indicate that the ego vehicle 160 may cross from the lane 154b and into the oncoming traffic lane 154a. The predicted path 180 may indicate that the ego vehicle 160 may cross into the path 176 of the vehicle 162. An incident between the ego vehicle 160 and the vehicle 162 may be imminent (or probable) without evasive action.

The path 170, the impact 172 and the path 174 may comprise the incident. In an example, in response to the impact 172, the control unit 60 may activate the actuator 58 (e.g., airbags may be deployed). In order to activate the actuator 58, the arm control path 70 may generate the arm signal A and the deploy control path 72 may generate the deploy signal D and the signal ACT may be generated. The predicted path 180 may be a potential post-incident behavior of the ego vehicle 160. For example, a status of the driver of the ego vehicle 160 may be unknown after the impact 172. The driver of the ego vehicle 160 may be unconscious, injured and/or in a panic due to the impact 172 and may be unable to manually perform the evasive action (or unable to react quickly enough) in order to prevent the ego vehicle 160 from crossing into the path 176 of the vehicle 162.

The E2E module 100 may be configured to snoop the status of the arm signal A. The control unit 60 may have deployed the actuator 58 without input from the E2E module 100 (e.g., the arm signal A may have been activated in response to the remote sensors 62 and/or the central sensors 64 detecting the impact 172). Since the control unit 60 may have deployed the actuator 58 in response to the impact 172, the E2E module 100 may detect that the arm signal A is active. For example, the bypass signal B may indicate that the arm signal A has been activated. The E2E module 100 may generate the remote signal REM in response to detecting that the arm signal A has been activated. For the post-incident activation, the E2E module 100 may initiate the E2E communication of the signal REM to the end device 52 over the bus 56.

In one example, the end device 52 may be configured to control the actuator 54 for activating the brakes of the ego vehicle 160. The E2E module 100 may be an initiating end of the E2E communication and the end device 52 may be a receiving end of the E2E communication. The end device 52 may be able to trust the data in the remote signal REM generated by the E2E module 100. In response to the remote signal REM, the end device 52 may activate the actuator 54. For example, the brakes may be activated to stop the ego vehicle 160 from continuing along the predicted path 180. The incident may be the impact 172, and the E2E module 100 may be configured to enable a post-incident response (or reaction) of activating the brakes.

Figure 4:
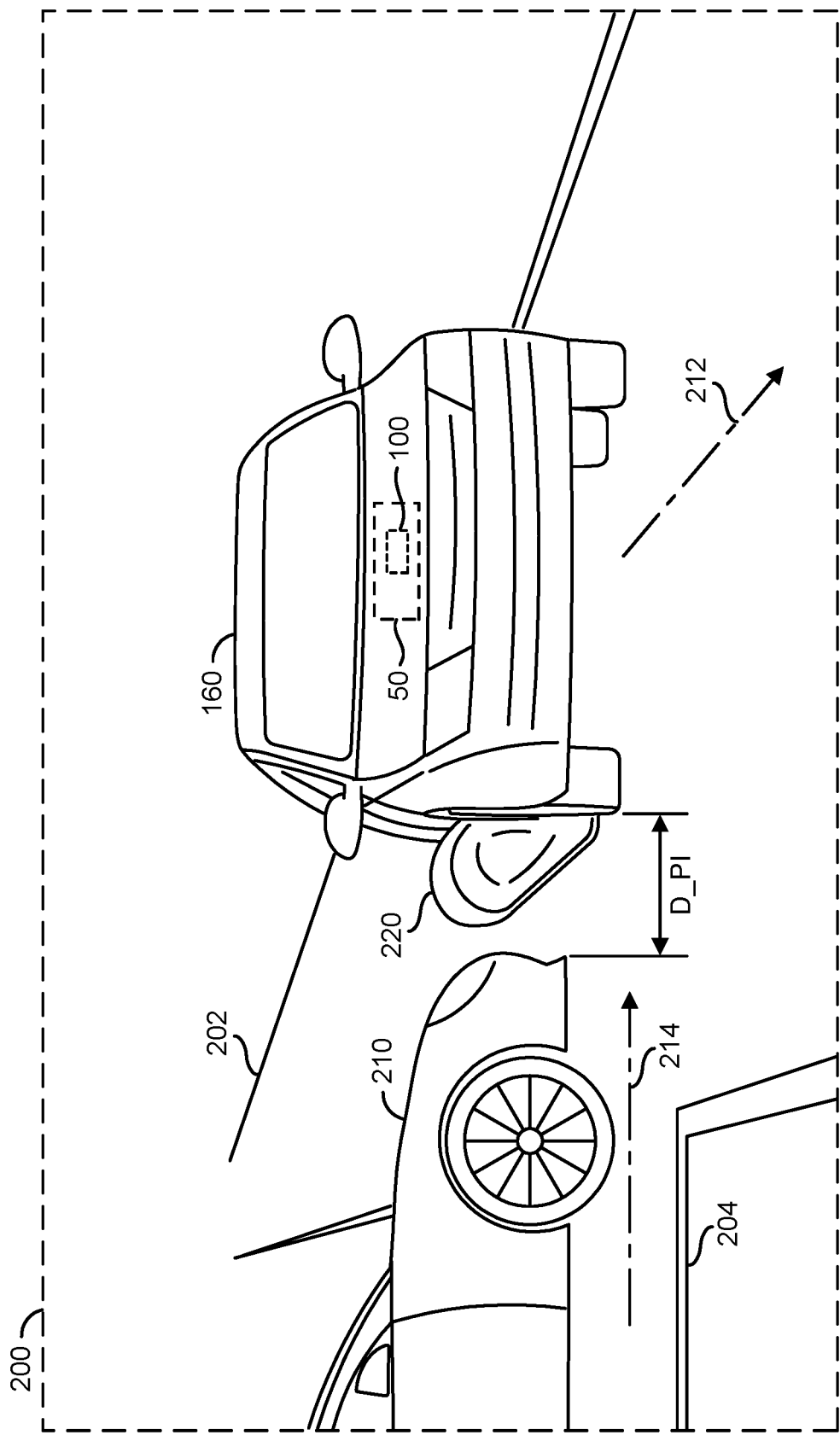
FIG. 4 is a diagram illustrating an example scenario for using built-in end-to-end communication protection in ASIC hardware for a signal chain to perform a pre-incident activation.

Referring to FIG. 4, a diagram illustrating an example scenario for using built-in end-to-end communication protection in ASIC hardware for a signal chain to perform a pre-incident activation is shown. An example scenario 200 is shown. The example scenario 200 may illustrate functionality enabled by the E2E module 100.

The example scenario 200 may comprise a road 202 and a road 204. The road 202 may be perpendicular to the road 204. For example, the example scenario 200 may illustrate an intersection of the road 202 and the road 204.

The ego vehicle 160 is shown driving on the road 202. The ego vehicle 160 may implement the system 50 shown in association with FIG. 1. The E2E module 100 is shown implemented by the ego vehicle 160. A vehicle 210 is shown driving on the road 204. A dotted arrow 212 is shown extending from a front of the ego vehicle 160. The dotted arrow 212 may indicate a direction of travel of the vehicle 160 on the road 202. A dotted arrow 214 is shown extending from a front of the vehicle 210. The direction of travel 214 may indicate that the vehicle 210 may collide with the ego vehicle 160 at the intersection between the road 202 and the road 204.

The ego vehicle 160 may be in a pre-incident situation. For example, a collision between the ego vehicle 160 and the vehicle 210 may be imminent and/or unavoidable. In the example shown, the vehicle 210 may T-bone the ego vehicle 160 regardless of any action taken by the vehicle 160. A distance D_PI is shown. The distance D_PI may illustrate a current distance between the ego vehicle 160 and the vehicle 210. The distance D_PI may indicate that the ego vehicle 160 and the vehicle 210 are currently pre-incident (e.g., a collision has not yet occurred).

An airbag 220 is shown. The airbag 220 is shown deployed by the ego vehicle 160. The airbag 220 may be an external side airbag. The external side airbag 220 may be deployed on the side of the ego vehicle 160 facing the vehicle 210. The external side airbag 220 is shown deployed before the vehicle 210 has collided with the ego vehicle 160 (e.g., while there is still the distance D_PI between the vehicles).

The external side airbag 220 may illustrate an example of a pre-incident activation. The pre-incident activation of the external side airbag 220 may be enabled by the E2E communication performed by the E2E module 100. For example, the external side airbag 220 may be deployed in response to the signal ACT generated by the control unit 60 that implements the E2E module 100. The pre-incident activation enabled by the E2E module 100 may deploy the external side airbag 220 before any physical contact between the ego vehicle 160 and the vehicle 210 actually occurs.

In an example, the end device 52 may be implemented as part of a camera system (e.g., for performing computer vision), a lidar system, a radar system, etc. The end device 52 may be configured to detect the imminent collision between the vehicle 210 and the ego vehicle 160. In response to the detection of the imminent collision, the end device 52 may generate the signal REM. The signal REM may be communicated along the communication bus 56. For the pre-incident activation, the end device 52 may be the initiating end of the E2E communication and the E2E module 100 may be the recipient end of the E2E communication.

The E2E module 100 may be configured to generate the bypass signal B in response to the signal REM. The arm control path 70 may receive the bypass signal B and generate the arm signal A. The arm signal A may provide one independent portion of the activation of the actuator 58. For example, the bypass signal B may be used to generate the arm signal A instead of the data from the remote sensors 62 and/or the central sensors 64. If the microcontroller 66 independently decides to enable the deploy control path 72 to generate the deploy signal D, the activation enable circuitry 74 may generate the signal ACT. The signal ACT may enable the actuator 58. The external side airbag 220 may be deployed by the actuator 58.

The incident may be the potential collision between the vehicle 210 and the ego vehicle 160. The E2E module 100 may be configured to enable a pre-incident response (or reaction) of activating the external side airbag 220. Without the E2E module 100, the arm control path 70 may not be capable of generating the arm signal A until the remote sensors 62 and/or the central sensors 64 detect the collision (e.g., the collision may already have occurred by the time the remote sensors 62 and/or the central sensors 64 detect the collision).

Figure 5:
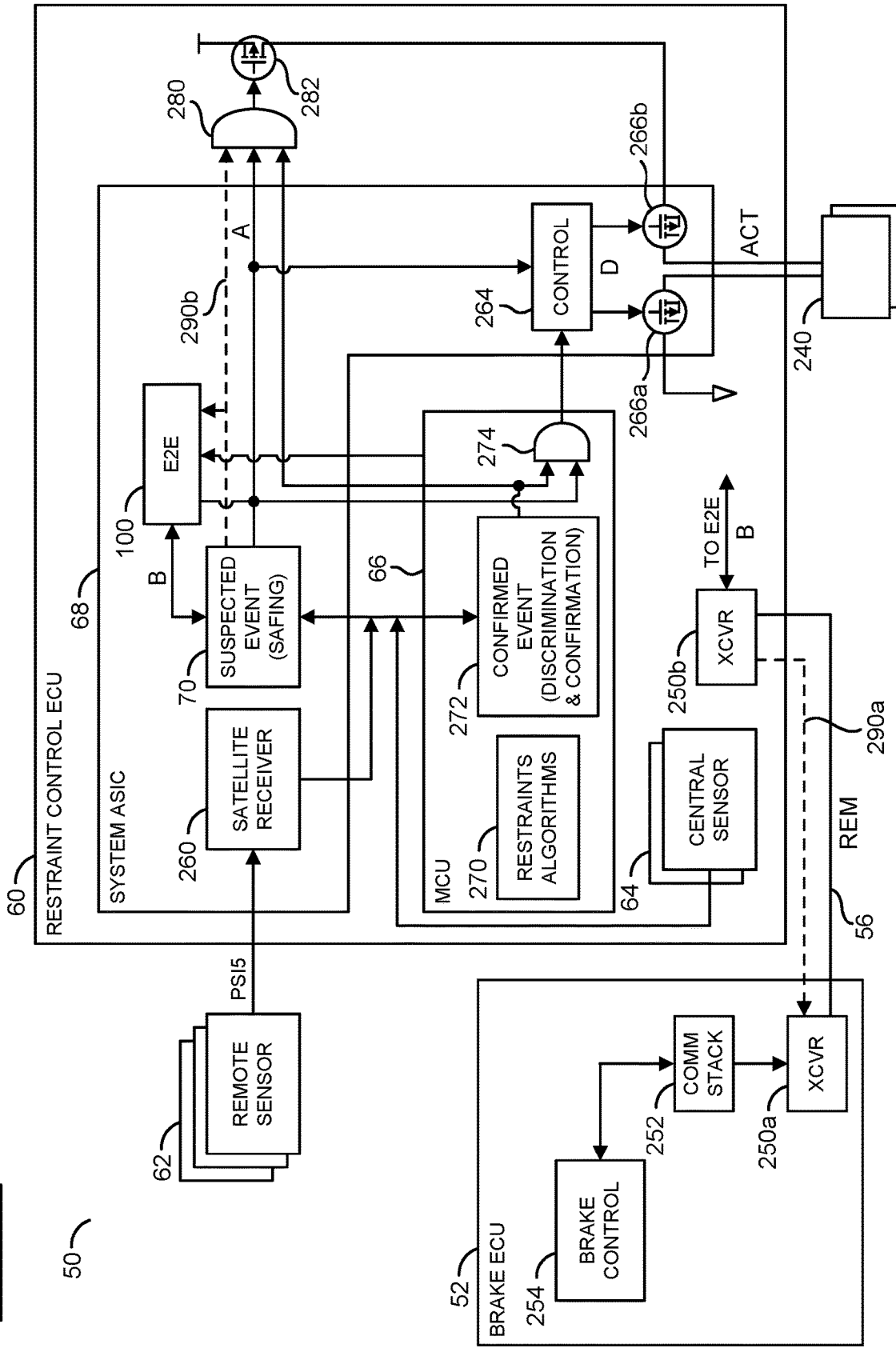
FIG. 5 is diagram illustrating a system for implementing a signal chain to perform a post-incident activation.

Referring to FIG. 5, a diagram illustrating a system for implementing a signal chain to perform a post-incident activation is shown. A detailed version of the system 50 is shown. The system 50 may comprise the end device 52, the bus 56, the control unit 60 and/or the remote sensors 62. The system 50 may further comprise a block (or circuit) 240. The circuit 240 may comprise one or more actuators. For example, the control unit 60 may be configured to control the deployment of various devices in the system 50. In one example, one of the components of the circuit 240 may be the actuator 58.

In the example shown, the end device 52 may be a brake electronic control unit. The brake electronic control unit 52 may be configured to control an actuator for brakes of the ego vehicle 160. For example, the brakes activated by the brake electronic control unit 52 may be the post-incident activation shown in association with FIG. 3.

The brake ECU 52 may comprise a transceiver 250a, a communication stack 252 and/or a brake control 254. The transceiver 250a may be configured to enable communication over the bus 56. The communication stack 252 may be configured packetize data to send/receive the signal REM (and other data). The brake control 254 may comprise various logic (e.g., logic gates, a microcontroller, registers, etc.) for determining when to activate the actuator 54 (e.g., actuate the brakes). The brake ECU 52 may be configured to operate according to an E2E profile. The E2E module 100 may be compatible with the E2E profile to enable communication with the brake ECU 52.

The control unit 60 may comprise the central sensors 64, the microcontroller 66, the ASIC 68 and/or a block (or circuit) 250*b*. The circuit 250*b* may implement a transceiver. The transceiver 250*b* may be configured to enable communication over the bus 56. The transceiver 250*b* may be configured to communicate data to/from the E2E module 100. The transceiver 250*b* may be configured to communicate data to/from the microcontroller 66 and/or other components of the control unit 60.

The transceivers 250*a*-250*b* may enable two end devices to communicate with each other over the communication bus 56. In the example shown for a post-incident activation, the brake ECU 52 may be a receiving end of the E2E communication and the control unit 60 may be an initiating end of the E2E communication. The transceivers 250*a*-250*b* may enable the two end devices to communicate with other end devices in the system 50 (e.g., not shown).

The ASIC 68 may comprise the arm control path 70, the E2E module 100, a block (or circuit) 260, a block (or circuit) 264 and/or blocks (or circuits) 266*a*-266*b*. The arm control path 70 is shown as event logic. The circuit 260 may implement a satellite receiver. The circuit 264 may implement control logic. The circuits 266*a*-266*b* may implement transistors (e.g., FETs). The ASIC 68 may comprise other components (not shown). The number, type and/or arrangement of the components of the ASIC 68 may be varied according to the design criteria of a particular implementation.

The satellite receiver 260 may be configured to receive data from the remote sensors 62 and/or the central sensors 64. The satellite receiver 260 may be configured to receive a signal (e.g., PSI5) from the remote sensors 62 and communicate with the microcontroller 66. The signal PSI5 may enable the satellite receiver 260 to receive data from satellite sensors (e.g., sensors located throughout the ego vehicle 160).

The arm control path 70 may comprise hardware logic configured to enable the ASIC 68 to determine whether to generate the arm signal A. In an example, the arm control path 70 may be configured to analyze the data from the signal PSI5 in order to determine whether to generate the arm signal A. The arm control path 70 may be configured to generate the arm signal A without input from the E2E module 100.

The E2E module 100 and/or the arm control path 70 may be configured to acquire data that may be used to generate the arm signal A. In one example, when the E2E module 100 is configured to disable pre-incident and/or post-incident functionality, the arm control path 70 alone may be configured to determine whether to generate the arm signal A. In another example, when the E2E module 100 is configured to enable pre-incident and/or post-incident functionality, the arm control path 70 may be configured to determine whether to generate the arm signal A based on the data from the remote sensors 62 and/or the central sensors 64, regardless of determinations made by the E2E module 100. In yet another example, the E2E module 100 may be configured to generate the arm signal A based on the remote signal REM generated by the end device 52, regardless of the status of the arm control path 70. In the example shown for a post-incident actuation of the brakes, the E2E module 100 may be configured to snoop a status of the arm signal A (e.g., determine when the arm signal A has been generated by the arm control path 70 in response to the information received from the remote sensors 62 and/or the central sensors 64).

The control logic 264 may comprise the deploy control path 72 of the ASIC 68. The control logic 264 may be configured to receive a signal from the microcontroller 66. In one example, the signal from the microcontroller 66 may be an SPI signal. The control logic 264 may be configured to generate the deploy signal D in response to the signal from the microcontroller 66. The control logic 264 may be configured to receive the arm signal A. For example, the arm signal A may be used by the control logic 264 as an enable for the deployment command. The control logic 264 may be configured to present the deploy signal D to the transistors 266*a*-266*b*.

The microcontroller 66 may comprise a block (or circuit) 270, a block (or circuit) 272 and/or a block (or circuit) 274. The circuit 270 may comprise a memory configured to implement various restraint decision-making. The circuit 272 may comprise computer executable instructions configured to confirm events and/or discriminate between events. The circuit 274 may implement a logic device. In the example shown, the logic device 274 may comprise an AND gate. The microcontroller 66 may comprise other components (not shown). The number, type and/or arrangement of the components of the microcontroller 66 may be varied according to the design criteria of a particular implementation.

The computer readable instructions stored by the block 270 and/or the block 272 may be executed by the microcontroller 66 in order to determine whether to generate the signal in order to instruct the control logic 264 to generate the deploy signal D. In an example, the microcontroller 66 may receive input from the central sensors 64 and the computer readable instructions stored by the block 270 and/or the block 272 may be configured to analyze the input and/or make determinations about whether to have the deploy signal D generated in response to the input.

The control circuit 60 is further shown comprising a block (or circuit) 280 and/or a block (or circuit) 282. The circuit 280 may comprise a logic gate. In the example shown, the logic gate may comprise an AND gate. The circuit 282 may comprise a transistor (e.g., a FET). The logic gate 280 may be configured to enable the transistor in response to the arm signal A (e.g., generated by the event logic 262 and/or the E2E module 100). Activating the transistor 282 may provide an input to the transistor 266*b*. When both the arm signal A and the deploy signal D have been generated (e.g., independently by the arm control path 70 and the deploy control path 72, respectively), the transistors 266*a*-266*b* may be enabled to provide the activation signal ACT to the actuators 240. The transistor 282 may be implemented to provide another layer of protection (e.g., independence) for triggering a deployment of the actuators 240. For example, the transistor 282 may comprise a MOS-FET gate configured as a supply to the deployment transistor 266*b*. The output of the logic gate 280 for the arm signal A may inhibit a potential failure within the ASIC 68 that may actuate the activation signal ACT.

The arm control path 70 and the deploy control path 72 (e.g., the control logic 264 receiving input from the microcontroller 66) may rely on the same inputs (e.g., data from the remote sensors 62, data from the central sensors 64 and/or data from the end device 52). However, the arm control path 70 and the deploy control path 72 (and the microcontroller 66) may analyze the same inputs independently. Analyzing the same inputs independently may ensure that the decision to deploy the actuators 240 is valid. For example, by independently analyzing the same inputs, a false positive by any of the arm control path 70, the deploy control path 72 and the microcontroller 66 alone may not lead to an improper deployment of the actuators 240. For example, without the arm control path 70 and the deploy control path 72 both confirming the data, the actuators 240 may not be able to be deployed (e.g., each components makes an independent decision to ensure that the actuators 240 are deployed under the correct conditions to prevent misfires). The generation of the arm signal A may be triggered by the arm control path 70 (e.g., analyzing data from a protocol such as SPI) and/or the E2E module 100 while the deploy control path 72 may rely on the signal chain and decision-making of the microcontroller 66. When both the arm signal A and the deploy signal D are activated, a supply may be enabled to the transistors 266a-266b and the transistor 282. The activation of the transistors 266a-266b and the transistor 282 may enable a current to go through the actual physical loop in the ego vehicle 160 to enable deployment of the actuators 240.

The event logic implemented by the arm control path 70 may trigger the arm signal A in response to data obtained within the control unit 60. The E2E module 100 may be configured to enable the arm signal A to be generated in response to external data (e.g., the signal REM). By implementing the E2E module 100, other modules, such as a computer vision module or radar module (shown in association with FIG. 6) may enable the arm signal A to be activated. The E2E module 100 may enable the external data to be interacted with and trusted. The E2E module 100 may be configured to snoop the status of the arm signal A to provide information to an external module (e.g., the brake ECU 52, in the example shown).

Dotted lines 290a-290b are shown. The dotted line 290a may represent a transfer of data for the E2E path. For example, the transfer of data for the E2E path 290a may be performed over the bus 56). The dotted line 290b may represent a transfer of data for the arm path.

In the example shown, the arm path data transfer 290b may be generated by the event logic of the arm control path 70. The arm signal A may be presented to the logic gate 280. For example, in response to the impact 172 (shown in association with FIG. 3) the remote sensors 62 and/or the central sensors 64 may present data to the microcontroller 66. In an example, the signal PSI5 received by the satellite receiver 260 may be in a specific format (e.g., a Manchester data format). The satellite receiver 260 may convert the data to a format receivable by the microcontroller 66 (e.g., a SAFE SPI protocol). Similarly, the microcontroller 66 may receive the data from the central sensors 64 (e.g., received in a format such as SPI). The event logic of the arm control path 70 may be configured to monitor the data received by the microcontroller 66 to detect for a specific event. For example, the event logic of the arm control path 70 may analyze the data to determine that an impact has been detected. In response to the analysis, the arm control path 70 may generate the arm signal A. While the data communication may be described using an SPI communication link (e.g., between the microcontroller 66 and various components of the ASIC 68), other types of communication links may be implemented. The type of communication implemented between the remote sensors 62, the central sensors 64, the microcontroller 66 and/or various components of the ASIC 68 may be varied according to the design criteria of a particular implementation.

The deploy signal D may be presented to the transistors 266a-266b in response to the deploy signal D generated by the control logic 264. The control logic 264 may generate the deploy signal D in response to data presented by the microcontroller 66. In one example, the microcontroller 66 may generate the data in an SPI communication protocol in response to the analysis of the data received from the central sensors 64.

In the example shown, the E2E path data transfer 290a may be generated by the E2E module 100 and presented to the transceiver 250b (e.g., in response to snooping the status of the arm control signal A). The transceiver 250b may transmit the signal REM over the communication bus 56 to the transceiver 250a of the brake ECU 52. For example, in response to the impact 172, the arm signal A and the deploy signal D may be independently generated to deploy the actuators 240 (e.g., an airbag may be deployed in response to the impact 172, seatbelt restraints may be activated, etc.). The deployment of the actuators 240 may be generated in response to the incident (e.g., the impact 172).

The E2E module 100 may enable the post-incident activation of the brakes by snooping the status of the arm signal A. The E2E module 100 may detect that the arm signal A has been activated. The E2E module 100 may present the bypass signal B to the transceiver 250b as part of the E2E data transfer 290a. The transceiver 250b may generate the signal REM in response to the bypass signal B and the remote signal REM may be presented to the end device 52 as part of the E2E data transfer 290a. The E2E module 100 may generate the bypass signal B and/or the remote signal REM to be compatible with the E2E profile implemented by the brake ECU 52 (e.g., to ensure compatibility with the signal deployment chain). The brake ECU 52 may determine whether to deploy the brakes in response to the remote signal REM. For example, the brake ECU 52 may implement independent logic that may determine whether to activate the brakes. The remote signal REM may be used by the independent logic of the brake ECU 52 to determine whether to activate the brakes. The activation of the brakes may be a post-incident activation. While the example of the system 50 shown in association with FIG. 5 may refer to post-incident activation of brakes, other types of end devices may receive the remote signal REM to implement other types of post-incident responses.

The E2E module 100 may be configured to snoop a status of the arm signal A periodically. In one example, the E2E module 100 may occur at a 500 μs rate. A communication between the two communication ends may be started during operation of the E2E module 100 and may not stop for the remainder of the power cycle. The periodic communication may allow for real-time update of arm status provision from the communication end of the ASIC 68 to the other communication end of the external component (e.g., the ECU 52).

Figure 6:
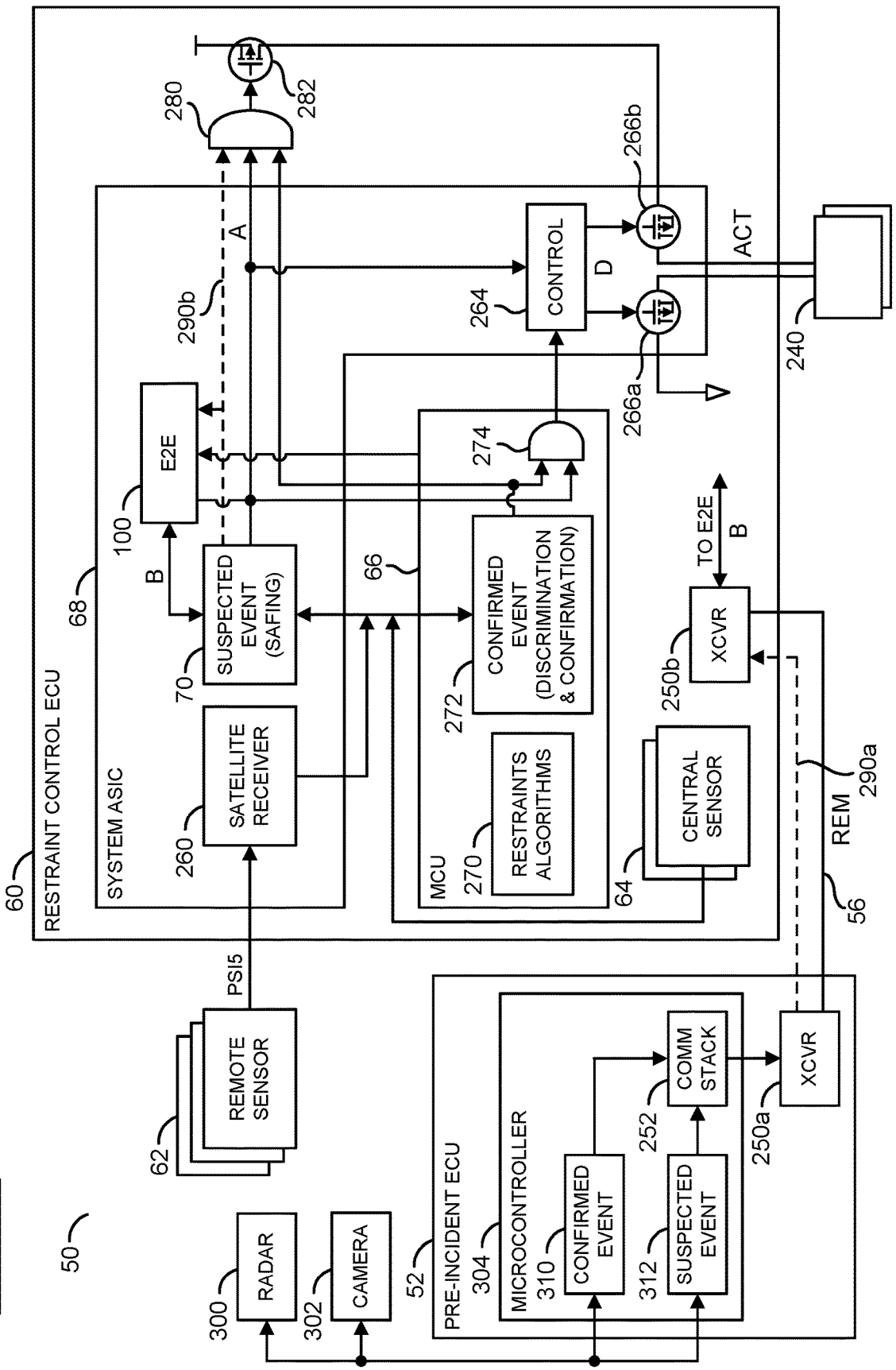
FIG. 6 is a diagram illustrating a system for implementing a signal chain to perform a pre-incident activation.

Referring to FIG. 6, a diagram illustrating a system for implementing a signal chain to perform a pre-incident activation is shown. A detailed version of the system 50 is shown. The system 50 may comprise the end device 52, the bus 56, the control unit 60, the remote sensors 62 and/or the actuators 240. The implementation of the control unit 60, the remote sensors 62, the actuators 240 and/or the components of the control unit 60 (e.g., the central sensors 64, the microcontroller 66, the ASIC 68, the arm control path 70, the E2E module 100, the transceiver 250b, the satellite receiver 260, the control logic 264, the transistors 266a-266b, the computer readable instructions 270-272, the logic gate 274, the logic gate 280, the transistor 282, etc.) may have a similar implementation as described in association with FIG. 5.

The system 50 may further comprise a block (or circuit) 300 and/or a block (or circuit) 302. The circuits 300-302 may comprise examples of active sensors implemented by the system 50. In the example shown, active sensor 300 may be a radar sensor and the active sensor 302 may be a camera (e.g., to enable computer vision). Other types of active sensors may be implemented (e.g., lidar). The types of active sensors implemented may be varied according to the design criteria of a particular implementation.

In the example shown, the end device 52 may be a pre-incident electronic control unit. The pre-incident ECU 52 may be configured to receive information from the active sensors 300-302. The pre-incident ECU 52 may be configured to analyze the information from the active sensors 300-302 in order to determine and/or predict imminent (or potential) incidents. For example, the incident that may be predicted by the pre-incident ECU 52 may be the imminent collision shown in association with FIG. 4.

The pre-incident ECU 52 may comprise the transceiver 250a and/or a microcontroller 304. The microcontroller 304 may be configured to receive data, perform calculations in response to the data received and/or generate signals. The microcontroller 304 may have a similar implementation to the microcontroller 66 but implement different logic and/or computer readable instructions (e.g., logic and/or instructions suitable for the particular type of the actuator 54 controlled by the pre-incident ECU 52). The microcontroller 304 may comprise the communication stack 252 and/or event logic 310-312. The event logic 310-312 may be configured to determine whether an event (or incident) has occurred or may be imminent based on the data received from the active sensors 300-302. For example, the event logic 310-312 may be configured to determine that a collision is imminent between the ego vehicle 160 and the vehicle 210 as shown in association with FIG. 4 based on computer vision analysis (e.g., using a camera to detect the vehicle 210 approaching). The transceiver 250a may be configured to enable communication over the bus 56. The communication stack 252 may be configured packetize data to send/receive the signal REM (and other data).

The microcontroller 310 may comprise various logic and/or hardware for detecting and/or confirming an incident. In response to detecting and/or confirming the incident, the transceiver 250a may be configured to present the remote signal REM to the communication bus 56. The remote signal REM may be received by the transceiver 250b of the control unit 60. The pre-incident ECU 52 may be configured to operate according to an E2E profile. The E2E module 100 may be compatible with the E2E profile to enable communication with the pre-incident ECU 52.

Since the incident has not yet occurred, the remote sensors 62 and/or the central sensors 64 may not be able to detect the incident (e.g., the remote sensors 62 and/or the central sensors 64 may not detect the vehicle 210 until a physical force has been detected). Without data from the remote sensors 62 and/or the central sensors 64, the arm control path 70 may not be able to determine whether to generate the arm signal A and the microcontroller 66 may not be able to determine whether to communicate with the control logic 264 to generate the deploy signal D. However, the E2E module 100 may enable the arm control path 70 to generate the arm signal A.

The E2E data transfer 290a and the arm data transfer 290b are shown. In the example shown, the pre-incident ECU 52 may be the end device that initiates the E2E communication and the E2E module 100 may be the recipient end device. The E2E path data transfer 290a may be generated by the pre-incident ECU 52 and presented to the transceiver 250b. The transceiver 250a may transmit the remote signal REM over the communication bus 56 in response to the event detected. The transceiver 250a may transmit the remote signal REM over the communication bus 56 to the transceiver 250b of the control unit 60. For example, in response to the imminent (or confirmed) incident (e.g., the detection of the vehicle 210 approaching the ego vehicle 160), the remote signal REM may be presented to the E2E module 100.

The transceiver 250b may present the remote signal REM to the E2E module 100 as part of the E2E data transfer 290a. In response to the remote signal REM, the E2E module 100 may validate the data (e.g., ensure the data is in accordance with the E2E profile) and may generate the bypass signal B for the arm control path 70. In the example shown, the arm path data transfer 290b may be generated by the arm control path 70 or the E2E module 100. In an example, the E2E module 100 may present the bypass signal B to the event logic for the arm control path 70. The arm signal A may be presented to the logic gate 280. For example, in response to the event detected by the pre-incident ECU (e.g., the imminent collision shown in association with FIG. 4) the E2E module 100 may receive the remote signal REM. The E2E module 100 may generate the bypass signal B in response to the remote signal REM to enable the arm control path 70 to generate the arm signal A. The generation of the arm signal A may be the arm path data transfer 290b.

The deploy signal D may still need to be independently generated by the control logic 264. For example, the arm signal A alone, generated in response to the E2E module 100 receiving the remote signal REM, may not be sufficient for the transistors 266a-266b to generate the activation signal ACT. In some embodiments, the microcontroller 66 may also receive data from the pre-incident ECU 52 (or other devices in the system 50) and determine whether or not to cause the control logic 264 to generate the deploy signal D. For example, the data payload from the signal REM may be passed to the microcontroller 66. The microcontroller 66 may transform the data payload from a CAN frame to another format (e.g., an SPI frame) without the microcontroller 66 touching the content of the data payload. The data payload may be presented to the E2E module 100 to determine whether the arm signal A may be generated. The microcontroller 66 may independently analyze the data to determine whether to enable the deploy signal D to be generated.

If the arm signal A and the deploy signal D have been independently generated, then the actuators 240 may be deployed (e.g., the external side airbag 220 shown in association with FIG. 4 may be deployed in response to the imminent event). The E2E module 100 may enable the pre-incident activation of the external side airbag 220 in response to receiving the remote signal REM. Since the E2E module 100 ensures that the data from the pre-incident ECU 52 has not been tampered with (e.g., by the microcontroller 66 or other components), the arm control path 70 may be able to use the information with confidence. The E2E module 100 may present the bypass signal B to the arm control path 70 as part of the E2E data transfer 290a. Receiving the remote signal REM to enable the arm control path 70 to generate the arm signal A may ensure that there is still independent operation between the arm control path 70 and the deploy control path 72. For example, the actuator 240 may not be deployed unless both the arm signal A and the deploy signal D have been generated. For example, the E2E module 100 may enable the information from the pre-incident ECU 52 to be used as independent confirmation that may be used to determine whether to activate the actuator 240. While the example of the system 50 shown in association with FIG. 6 may refer to pre-incident activation of the external side airbag 220, other types of responses may be implemented for other types of pre-incident responses (e.g., seatbelt restraints, etc.).

Figure 7:
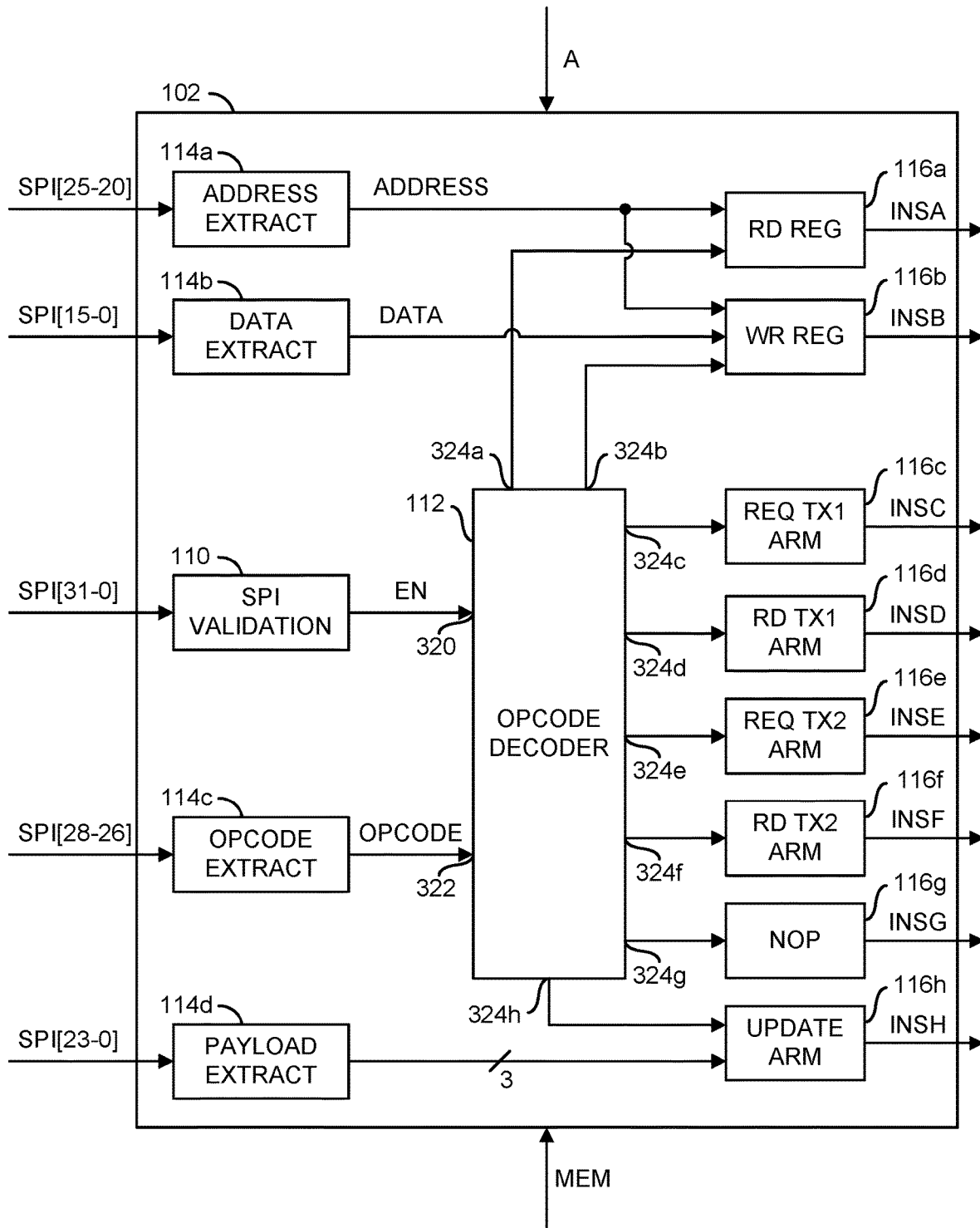
FIG. 7 is a block diagram illustrating communication logic hardware for implementing the end-to-end communication.

Referring to FIG. 7, a block diagram illustrating communication logic hardware for implementing the end-to-end communication is shown. A block diagram of the communication logic 102 is shown. The communication logic 102 may be one component of the E2E module 100 as shown in association with FIG. 2.

The communication logic 102 may be configured to receive a signal (e.g., SPI), a signal (e.g., MEM) and the arm signal A. The communication logic 102 may be configured to generate signals (e.g., INSA-INSH). The communication logic 102 may be configured to send/receive other signals (not shown). The number, type and/or arrangement of the signals communicated to/from the communication logic 102 may be varied according to the design criteria of a particular implementation.

The signal SPI may be communicated from the microcontroller 66. The signal SPI may comprise a data payload. The signal SPI may comprise instructions, addresses, opcodes, etc. The signal SPI may be communicated to/from the microcontroller 66. In one example of a receive scenario, the microcontroller 66 may extract payload elements from the vehicle network (e.g., the bus 56) to repackage the data payload from the signal REM (e.g., without altering the data payload) and transmit the data payload as the signal SPI to the E2E module 100. In one example of a transmit scenario, the microcontroller 66 may extract payload elements from the signal SPI to provide the signal REM to the vehicle network (e.g., the bus 56). In the example shown, the signal SPI may be split into various sub-components that may be usable by various circuits of the communication logic 102 (e.g., SPI[15-0], SPI[23-0], SPI[31-0], SPI[25-20], SPI[28-26], etc.).

The signal MEM may be received from the memory 104. The signal MEM may comprise configuration data for the various components of the communication logic 102. The signal MEM may comprise status information that may be used by the communication logic 102. The signal MEM may be generated in response to data stored in the register map of the memory 104.

The communication logic 102 may comprise the data validation block 110, the decoder 112, the data extraction hardware logic 114a-114d and/or the operation circuits 116a-116h. The data extraction hardware logic 114a may implement an address extraction module. The data extraction hardware logic 114b may implement a data extraction module. The data extraction hardware logic 114c may implement a code extraction module. The data extraction hardware logic 114d may implement a payload extraction module. The operation circuit 116a may implement a read register module. The operation circuit 116b may implement a write register module. The operation circuits 116c may implement a request arm transmit module. The operation circuits 116d may implement a read arm module. The operation circuits 116e may implement a request arm transmit module. The operation circuits 116f may implement a read arm module. The operation circuit 116g may implement a no operation module. The operation circuit 116h may implement an update arm status module. The communication logic 102 may comprise other components (not shown). The number, type and/or arrangement of the components of the communication logic 102 may be varied according to the design criteria of a particular implementation.

The data validation module 110 may be configured to receive the signal SPI[31-0]. The data validation module 110 may be configured to validate the data payload. The validation performed by the data validation module 110 may be performed before the decoder 112 extracts an opcode from the data payload. The data validation module 110 may validate the data if a parity value has an odd value and if a GID is unique for an E2E communication. In one example, the unique GID may be a value of 111. In response to determining that the data payload is valid, the data validation module 110 may generate a signal (e.g., EN). The signal EN may be an enable signal for the decoder 112.

The decoder 112 may be configured to route commands in response to data from the signal SPI. The opcode decoder 112 may comprise an input 320, an input 322 and a number of outputs 324a-324h. The input 320 may receive the signal EN (e.g., from the data validation module 110). The input 322 may receive a signal (e.g., OPCODE) from the code extraction module 114c. The outputs 324a-324h may provide an output to a respective one of the operation circuits 116a-116h. The signal EN may be an enable signal for the decoder 112. For example, the decoder 112 may not be enabled unless the data validation module 110 determines that the signal SPI is a valid E2E communication signal.

The decoder 112 may determine an instruction to perform in response to the signal EN and the signal OPCODE. The instruction determined by the decoder 112 may determine which of the operation circuits 116a-116h to activate in response to the signal OPCODE. For example, the signal EN and the signal OPCODE must be present for the decoder 112 to present an output on one of the outputs 324a-324h. The output generated by the decoder 112 may determine which command/instruction is performed by the communication logic 102 in response to the signal SPI.

The address extraction module 114a may be configured to receive the signal SPI[25-20]. The address extraction module 114a may be configured to extract a portion of the signal SPI that comprises an address. The address extraction module 114a may generate a signal (e.g., ADDRESS) in response to extracting the address from the signal SPI. The signal ADDRESS may be presented to the read register module 116a and the write register module 116b. The signal ADDRESS may comprise an address to a register in the register map 104. The signal ADDRESS may be used to select a register from the register map 104 for performing a read/write operation.

The data extraction module 114b may be configured to receive the signal SPI[15-0]. The data extraction module 114b may be configured to extract a portion of the signal SPI that comprises data. The data extraction module 114b may generate a signal (e.g., DATA) in response to extracting the data from the signal SPI. The signal DATA may be presented to the write register module 116b. The signal DATA may comprise data to be written to a register in the register map 104. The signal ADDRESS may be used to select a register from the register map 104 for performing a write operation and the signal DATA may be the data that is written to the selected register.

The code extraction module 114c may be configured to receive the signal SPI[28-26]. The data extraction module 114c may be configured to extract a portion of the signal SPI that comprises an opcode. The code extraction module 114c may generate the signal OPCODE in response to extracting the opcode from the signal SPI. The signal OPCODE may be presented to the input 322 of the decoder 112. The signal OPCODE may be used by the decoder 112 to determine an instruction from the data payload.

The decoder 112 may be configured to decode the instruction from the signal OPCODE. In one example, the signal OPCODE may comprise three bits. In an example, the decoder 112 may enable: the output 324g (e.g., for the no operation module 116g) when the signal OPCODE is 000, the output 324e (e.g., for the request arm transmit module 116e) when the signal OPCODE is 001, the output 324a (e.g., for the read register module 116a) when the signal OPCODE is 010, the output 324d (e.g., for the read arm module 116d) when the signal OPCODE is 011, the output 324b (e.g., for the write register module 116b) when the signal OPCODE is 100, the output 324f (e.g., for the read arm module 116f) when the signal OPCODE is 101, the output 324c (e.g., for the request arm transmit module 116c) when the signal OPCODE is 110, and the output 324h (e.g., for the update arm status module 116h) when the signal OPCODE is 111. The instruction decoded by the decoder 112 for a particular value of the signal OPCODE may be varied according to the design criteria of a particular implementation.

The payload extraction module 114d may be configured to receive the signal SPI[23-0]. The payload extraction module 114d may be configured to extract a portion of the signal SPI that comprises a data payload. The payload extraction module 114d may generate three separate signals in response to extracting the data payload from the signal SPI. One of the signals may be a cyclic redundancy check (CRC) signal, one of the signals may be a counter, and one of the signals may be an arm status signal. The three signals may be presented to the update arm status module 116h. The CRC may be calculated using the counter, the arm status and a secured data ID. Other data within a data payload frame may be ignored from the CRC calculation. The elements of the data payload may not be required to be atomic within the communication network frame.

The arm status signal may be configured to represent various E2E arm signals implemented by the E2E module 100. The E2E arm signals may be mapped to physical arm signals of the ASIC 68 (e.g., to be described in association with FIG. 11). The arm status signal may comprise one coherent byte (8 bits). Each bit of the arm status signal may represent a particular E2E arm signal. In one example, the layout of the arm status signal may comprise bit 0 representing E2E_ARM0, bit 1 representing E2E_ARM1, bit 2 representing E2E_ARM2, bit 3 representing E2E_ARM3, bit 4 representing E2E_ARM4, bit 5 representing E2E_ARM5, bit 6 representing E2E_ARM6 and bit 7 representing E2E_ARM7. The layout of the arm status signal may be varied according to the design criteria of a particular implementation.

The state of each bit in the arm status signal may represent a request to activate or deactivate the arming of the corresponding E2E arm signal. In one example, a logical high value (or a value of "1") in the arm status signal may represent a request to activate arming for the corresponding E2E arm signal (e.g., a value of "1" for bit 0 may activate E2E_ARM0). In another example, a logical low value (or a value of "0") in the arm status signal may represent a request to deactivate arming for the corresponding E2E arm signal (e.g., a value of "0" for bit 3 may deactivate E2E_ARM3). While an example with a logical high corresponding to an activation and a logical low corresponding to a deactivation has been described, the arm status signal may be similarly implemented with a logical high corresponding to a deactivation and a logical low corresponding to an activation.

The read register module 116a may be configured to generate an instruction to read a selected register from the register map 104. In an example, the read register module 116a may enable a read from an E2E configuration register of the configuration register sets 120a-120n. The read register module 116a may receive the signal ADDRESS from the address extraction module 114a and the enable signal from the output 324a of the decoder 112. The read register module 116a may be configured to generate the signal INSA. The signal INSA may be presented to the register map 104 in response to the signal ADDRESS (e.g., indicate which register to read) and the enable signal from the output 324a (e.g., when the signal OPCODE decodes to the read register instruction). The signal INSA may comprise the address for the configuration register.

The write register module 116b may be configured to generate an instruction to write to a selected register of the register map 104. In an example, the write register module 116b may enable a write to an E2E status register of the status register sets 122a-122n. The write register module 116b may receive the signal ADDRESS from the address extraction module 114a, the signal DATA from the data extraction module 114b and the enable signal from the output 324a of the decoder 112. The write register module 116b may be configured to generate the signal INSB. The signal INSB may be presented to the register map 104 in response to the signal ADDRESS (e.g., indicate which register to write to), the signal DATA (e.g., to provide the data to be written to the register) and the enable signal from the output 324b (e.g., when the signal OPCODE decodes to the write register instruction). The signal INSB may comprise the address for the status register and the data to write.

The request arm transmit module 116c may be configured to generate an instruction to request a generation of an E2E TX1 message. The request arm transmit module 116c may receive the enable signal from the output 324c of the decoder 112. The request arm transmit module 116c may be configured to generate the signal INSC.

The read arm transmit module 116d may be configured to generate an instruction to read the TX1 ARM message. The read arm transmit module 116d may provide a request with the instruction provided by the request arm transmit module 116c. The read arm transmit module 116d may receive the enable signal from the output 324d of the decoder 112. The read arm transmit module 116d may be configured to generate the signal INSD. The request arm transmit module 116e may be configured to generate an instruction to request a generation of an E2E TX2 message. The request arm transmit module 116e may receive the enable signal from the output 324e of the decoder 112. The request arm transmit module 116e may be configured to generate the signal INSE.

The read arm transmit module 116f may be configured to generate an instruction to read the TX2 ARM message. The read arm transmit module 116f may provide a request with the instruction provided by the request arm transmit module 116e. The read arm transmit module 116f may receive the enable signal from the output 324f of the decoder 112. The read arm transmit module 116f may be configured to generate the signal INSF.

The request arm transmit module 116c may be configured to enable the E2E module 100 to provide specific operations that trigger the ASIC 68 to construct a payload specific to a TX1 configuration. Similarly, the request arm transmit module 116e may be configured to enable the E2E module 100 to provide specific operations that trigger the ASIC 68 to construct a payload specific to a TX2 configuration. The generated payload may be sent from the control unit 60 to an active safety ECU (e.g., the end device 52 implementing a brake ECU, a radar ECU, etc.). The signal INSC (e.g., communicating REQ_TX1 data) may be separate from the signal INSE (e.g., communicating REQ_TX2 data) to enable the control unit 60 to interface with two different active safety ECUs (e.g., over the bus 56). In an example, TX1 may be used to communicate with the brake ECU of the vehicle 160 and TX2 may be used to communicate with the radar ECU of the vehicle 160. The mapping of TX1 and TX2 may be configurable (e.g., TX1 may be used to communicate with the radar ECU and TX2 may be used to communicate with the brake ECU, or other active safety ECUs).

The arm status signal for TX1 (or TX2) contained in the payload may be specific to the TX1 (or TX2) configuration for integrating with the receiving ECU. The construction of the payload may require time for the ASIC 68 to complete. Therefore, the construction of the payload may be used as a trigger to begin the process where the read arm transmit module 116d may be used to move the generated payload for TX1 out of the vehicle bus 56. Similarly, the read arm transmit module 116f may be used to move the generated payload for TX2 out of the vehicle bus 56.

The no operation module 116g may be configured to generate an instruction to read status bits. In an example, the no operation module 116g may enable a read from an E2E status register of the status register sets 122a-122n. The no operation module 116g may receive the enable signal from the output 324g of the decoder 112. The read register module 116a may be configured to generate the signal INSG. The signal INSG may be presented to the register map 104.

The update arm status module 116h may be configured to generate an instruction to update an ARM status. In an example, the update arm status module 116h may perform a receive function. The update arm status module 116h may receive the output signals from the payload extraction module 114d (e.g., the CRC, the counter and the arm status) and the enable signal from the output 324h of the decoder 112. The update arm status module 116h may be configured to generate the signal INSH. The signal INSH may be configured to provide the bypass signal B to pass through as the arm signal A. The update arm status module 116h may enable the E2E module 100 to provide the arm signal A as one independent portion of the deployment (e.g., the arm control). Details about the data payload and/or the status of the arm signal A may be described in more detail in association with FIG. 9.

The signal INSH may implement an update arm status signal. The update arm status signal may be configured to enable an active safety ECU (e.g., the end device 52) to trigger the control unit 60 to activate arming using the E2E module 100. The update arm status operation may implement a trigger to enable passing the external arming request to the ASIC 68. For the update arm status signal, the payload may be transferred to apply the requested arming. Details of the arming from an external request may be described in association with FIG. 9.

The data payload may be protected by the calculation of the CRC. The payload extraction module 114d and/or the update arm status module 116h may be configured to perform the CRC for the data payload. The counter implemented by the payload extraction module 114d and/or the update arm status module 116h may be configured to ensure a freshness of the data (e.g., that the periodicity of the information is happening at a predetermined rate and there has been no data loss).

The configuration provided by the signal MEM may be used to determine which E2E arm bit within the communication may be used to arm a particular device in the ego vehicle 160. The configuration provided by the signal MEM may map the E2E arm signals generated by the request arm transmit module 116c and/or the request arm transmit module 116e to a physical arm signal in the ego vehicle 160 and/or map the E2E arm signals received over the bus 56 to the E2E arm signals received by the payload extraction module 114d. The arm signals sent and/or received by the E2E module 100 may be assigned to a specific deployment loop and/or actuator in the ego vehicle 160 (e.g., mapping the E2E arm signal to a physical arm signal). For example, the same arm signal (e.g., TX1 or TX2) may be used for more than one actuator and/or different actuator for each.

The E2E module 100 may be configured to manage two protected transmitted E2E arming messages (e.g., ARM_TX_1 and ARM_TX_2). A data field for ARM_TX_1 may be 8 bits. A data field for ARM_TX_2 may be 8 bits. A configurable arming matrix (to be described in association with FIGS. 10-11) may manage the data field of each protected E2E message. The data field for ARM_TX_1 and ARM_TX_2 may be generated in response to a status of the arm signal A (e.g., the arm result) inside the control unit 60. The E2E arming messages (e.g., ARM_TX_1 and ARM_TX_2) may be communicated to the bus 56 as the signal REM.

The update arm status module 116h may comprise a counter (e.g., a 4-bit counter). The E2E module 100 may increment the counter on every send request of the E2E arming message REM. The E2E module 100 may be compatible with various AUTOSAR profiles. In one example, for a first profile (e.g., Profile 1A) the counter may be initialized at 0, and then incremented from 0 to 14, and then restarted at 0. In another example, for another profile (e.g., Profile 02) the counter may be initialized at 0, and then incremented from 0 to 15, and then restarted at 0.

The counter implemented by the update arm status module 116h may be used in an error check (e.g., a CRC calculation). The CRC calculation may be transmitted as part of the E2E protected message REM. For each arming message sent or received by the E2E module 100, the E2E module 100 may be configured to calculate an 8 bit CRC. In an example, for a first profile (e.g., Profile 1A) the arming message may comprise Data ID bytes first, then the counter (preceded by 0xF), then the bytes containing the arming message. In another example, for another profile (e.g., Profile 02) the arming message may comprise Data ID bytes first, then the counter (preceded by 0xF), then the bits containing the arming message.

The Data ID may be used for calculating the CRC, but may not be transmitted with the arming message. The DATA ID bytes may be extracted according to one or more registers of the configuration register sets 120a-120n. The DATA ID bytes may be extracted the same way for the transmit or receive function. In an example, for the E2E receive function, the microcontroller 66 may write and read registers from the configuration register sets 120a-120n (e.g., the communication logic 102 may enable the read register module 116a and the write register module 116b for the read and write operations). When the configuration is completed, the microcontroller 66 may enable a receive function and send a command to update the E2E arm status. The microcontroller 66 may then send the NOP operation (e.g., the communication logic 102 may enable the no operation module 116g) to check receive status bits.

The communication logic 102 (e.g., the payload extraction module 114d) may be configured to evaluate a counter of each received arming message (e.g., the signal REM received from the end device 52) against a counter of a previously received message in order to detect if the counter has not been incremented or if the counter has been incremented by more than N counts (e.g., a configurable value between 1 to 4). The status register sets 122a-122n may be used to indicate message faults. The signal INSH generated by the update arm module 116h may be generated if there are not faults (e.g., no CRC error and the receive status OK is set in the status register sets 122a-122n). The signal INSH may be evaluated in order to set the E2E arming bit that has been mapped in the configuration register sets 120a-120n. The E2E arming bit may be valid until the E2E arm dwell timer is active (e.g., not expired). Details of the E2E arm dwell timer may be described in association with FIG. 12.

Figure 8:
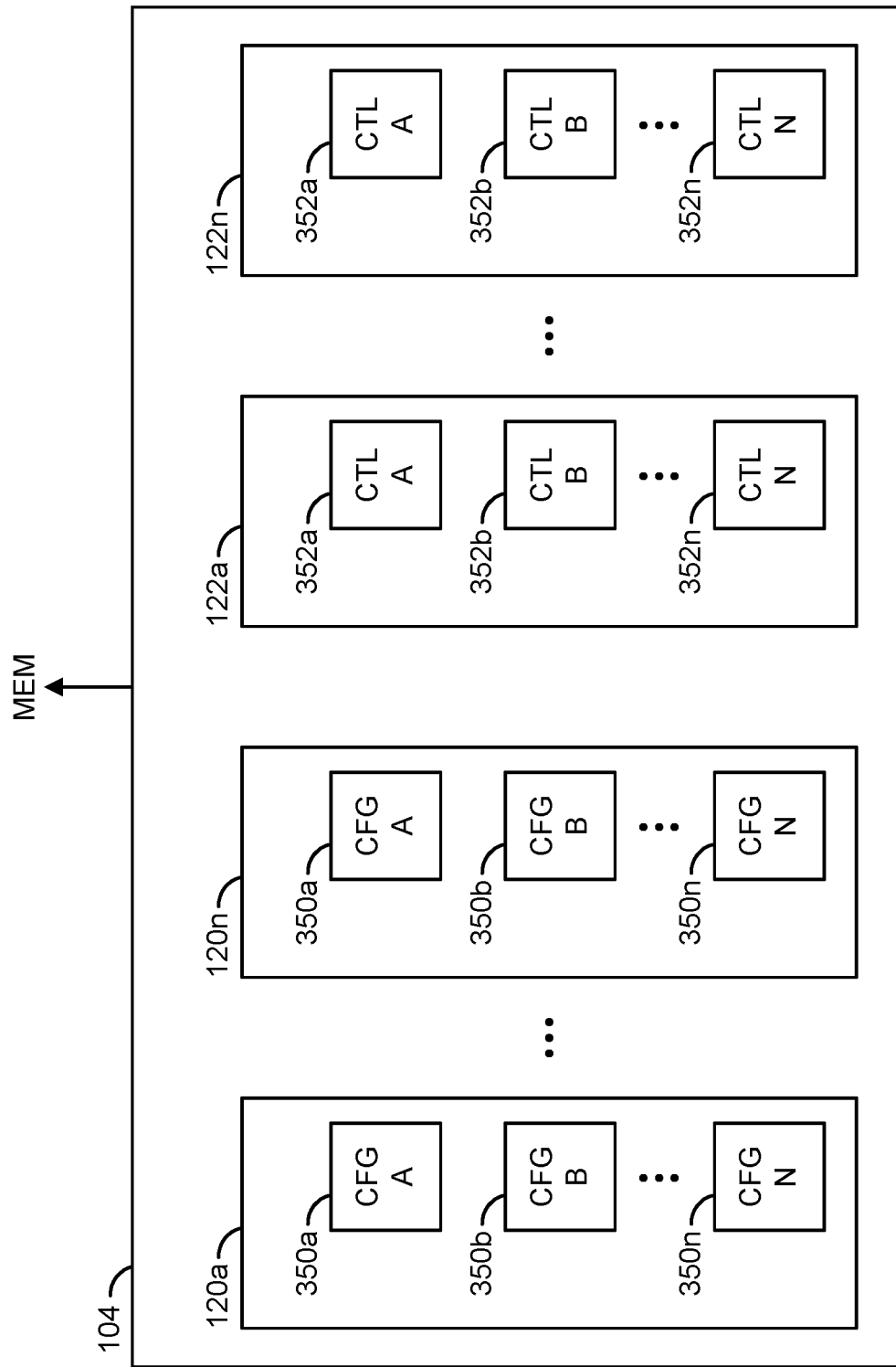
FIG. 8 is a block diagram illustrating a register map for implementing the end-to-end communication.

Referring to FIG. 8, a block diagram illustrating a register map for implementing the end-to-end communication is shown. The memory 104 is shown as the register map. The register map 104 may present the signal MEM. The signal MEM may be presented to the communication logic 102 as shown in association with FIG. 7. The memory 104 may send/receive other signals (not shown). The number, type and/or arrangement of the signals communicated to/from the memory 104 may be varied according to the design criteria of a particular implementation.

The register map 104 may comprise the configuration register sets 120a-120n and the status register sets 122a-122n. In the example shown, both the configuration register sets 120a-120n and the status register sets 122a-122n are each shown as having n number of register sets, the number of register sets implemented by the configuration register sets 120a-120n and the status register sets 122a-122n may be the same or different depending on the design criteria of a particular implementation.

Each of the configuration register sets 120a-120n are shown comprising a number of blocks (or circuits) 350a-350n. The circuits 350a-350n may each implement a configuration register. Each of the status register sets 122a-122n are each shown comprising a number of blocks (or circuits) 352a-352n. Each of the circuits 352a-352n may each comprise a status (or control) register. While each of the configuration register sets 120a-120n are shown implementing n of the configuration registers 350a-350n and each of the status register sets 122a-122n are shown implementing n of the status registers 352a-352n, the number of registers implemented by any of the configuration register sets 120a-120n and/or the status register sets 122a-122n may be the same and/or different depending on the design criteria of a particular implementation.

Each of the configuration registers 350a-350n may be read from in response to the read register instruction (e.g., INSA) and written to in response to the write register instruction (e.g., INSB) implemented by the communication logic 102. Similarly, each of the status registers 352a-352n may be read from in response to the read register instruction (e.g., INSA) and written to in response to the write register instruction (e.g., INSB) implemented by the communication logic 102. For example, the signal ADDRESS extracted by the address extraction module 114a may indicate which of the configuration register sets 120a-120n and the particular one of the configuration registers 350a-350n to read from or write to. In another example, the signal ADDRESS extracted by the address extraction module 114a may indicate which of the status register sets 122a-122n and the particular one of the status registers 352a-352n to read from or write to.

The configuration registers 350a-350n may be configured to store data that may enable the customization of the E2E module 100. Depending on the data stored in the configuration registers 350a-350n, particular functionality of the E2E module 100 may be enabled or disabled. In an example, particular combinations of data written to the configuration registers 350a-350n may enable or disable the reception of the arm request through the E2E module 100 and/or the transmission of the arm request through the E2E module 100. In another example, particular combinations of data written to the configuration registers 350a-350n may be used to select a profile of the E2E communication standard (e.g., to implement a P1A and a P02 profile of the E2E standard). The combinations of features that may be enabled or disabled using the configuration registers 350a-350n may be varied according to the design criteria of a particular implementation.

The status registers 352a-352n may be configured to store data that may provide information about a current state of the E2E module 100 and/or the control unit 60. In an example, one or more of the status registers 352a-352n may be configured to store a current state of the arm signal A (e.g., asserted or unasserted). In another example, one or more of the status registers 352a-352n may be configured to store information about a deployment of the pre-incident ECU 52. The type of information stored by the status registers 352a-352n may be varied according to the design criteria of a particular implementation.

In one example, one or more of the configuration register sets 120a-120n may implement global registers for the E2E module 100. In an example, for the global registers, the configuration registers 350a-350n may comprise an E2E global configuration register, a number (e.g., three) of data ID configuration registers, a number (e.g., sixteen) of data ID list configuration registers, etc. The global registers may be configurable for the use of dedicated and/or programmable data IDs and a programmable data ID list.

In one example, one or more of the configuration register sets 120a-120n may implement E2E TX1 configuration registers. In an example, for the E2E TX1 configuration registers, the configuration registers 350a-350n may comprise a TX1 arm configuration register and/or a number (e.g., four) of TX1 mapping configuration registers. The TX1 mapping configuration registers may be configured to map the E2E arm signals to the physical arm signals with respect to the E2E data payload.

In one example, one or more of the configuration register sets 120a-120n may implement E2E TX2 configuration registers. In an example, for the E2E TX2 configuration registers, the configuration registers 350a-350n may comprise a TX2 arm configuration register and/or a number (e.g., four) of TX2 mapping configuration registers. The TX1 mapping configuration registers may be configured to map the E2E arm signals to the physical arm signals with respect to the E2E data payload.

In one example, one or more of the configuration register sets 120a-120n may implement E2E RX configuration registers. In an example, for the E2E RX configuration registers, the configuration registers 350a-350n may comprise a number (e.g., four) E2E RX arm configuration registers, a number (e.g., four) E2E RX arm mapping configuration registers, an E2E RX arm DWELL configuration register, etc.

In one example, one or more of the status registers sets 122a-122n may implement E2E TX1 and/or TX2 control registers. In an example, for the E2E TX1 and/or TX2 control registers, the status registers 352a-352n may comprise an E2E TX1 arm validation register, an E2E TX1 arm status register, an E2E TX2 arm validation register, an E2E TX2 arm status register, etc. The validation registers may provide an indication of whether a valid signal has been generated (e.g., to provide the remote signal REM to the bus 56 that is compatible with the signal deployment chains) by the request arm transmit module 116c and/or the request arm transmit module 116f. The TX1 and/or TX2 arm status registers may be configured to provide a status of the request arm transmit module 116c and/or the request arm transmit module 116f.

In one example, one or more of the status register sets 122a-122n may implement E2E RX control registers. In an example for the E2E RX control registers, the status registers 352a-352n may comprise E2E RX validation registers, an E2E RX status registers and/or a number (e.g., eight) of E2E RX CFG timers. In some embodiments, an error may be stored in the status registers 352a-352n (e.g., a CRC error). The status registers 352a-352n may be configured to store information about and/or track a state of various parameters of the E2E module 100.

In one example, the status registers 352a-352n implementing the E2E RX validation registers may be configured to store a received rolling counter value (e.g., 4 bits), a previous rolling counter value (e.g., 4 bits), a no new data counter (e.g., if there is no difference between the current and previous rolling counter values) and/or an out of sync counter. In one example, the status registers 352a-352n implementing the E2E RX status registers may be configured to store various values determined based on the configuration and received values of a data field at each arm request and/or a CRC value computed for each update E2E arm request (e.g., based on the selected profile). In one example, the status registers 352a-352n implementing the E2E RX CFG timers may be configured to store selected lengths of time to use for an arm dwell time (e.g., tDWELL, to be described in association with FIG. 12) for each of the E2E arm signals (e.g., 0ms, 32 ms, 256 ms, 2048 ms, etc.). The types of data and/or the format of the data stored by the status registers 352a-352n may be varied according to the design criteria of a particular implementation.

The E2E module 100 may only allow write access to the configuration register sets 120a-120n in an initialization and/or diagnostic state. The configuration registers 350a-350n may be configured to control various functionality of the E2E module 100. In one example, the configuration registers 350a-350n may be configured to enable/disable E2E function. In another example, the configuration registers 350a-350n may be configured to enable/disable transmitting a first E2E remote arm transmission (e.g., E2E_TX_1 sent as the signal REM). In yet another example, the configuration registers 350a-350n may be configured to enable/disable transmitting a second E2E remote arm transmission (e.g., E2E_TX_2 sent as the signal REM). In still another example, the configuration registers 350a-350n may be configured to enable/disable receiving a remote arm signal (e.g., E2E_RX received from the signal REM). In one example, the configuration registers 350a-350n may be configured to store DATA_ID value(s) and/or length(es) for TX1/TX2/RX. In another example, the configuration registers 350a-350n may be configured to store a data field and AUTOSAR Profile to use for TX1/TX2/RX. In yet another example, the configuration registers 350a-350n may be configured perform the arm bit mapping to E2E signal for TX1/TX2/RX. In still another example, the configuration registers 350a-350n may be configured to select E2E RX message thresholds for timeout, events, and counter behaviors. In one example, the configuration registers 350a-350n may be configured to set the E2E receive arm dwell time. The functionality controlled by the configuration registers 350a-350n may be varied according to the design criteria of a particular implementation.

Figure 9:
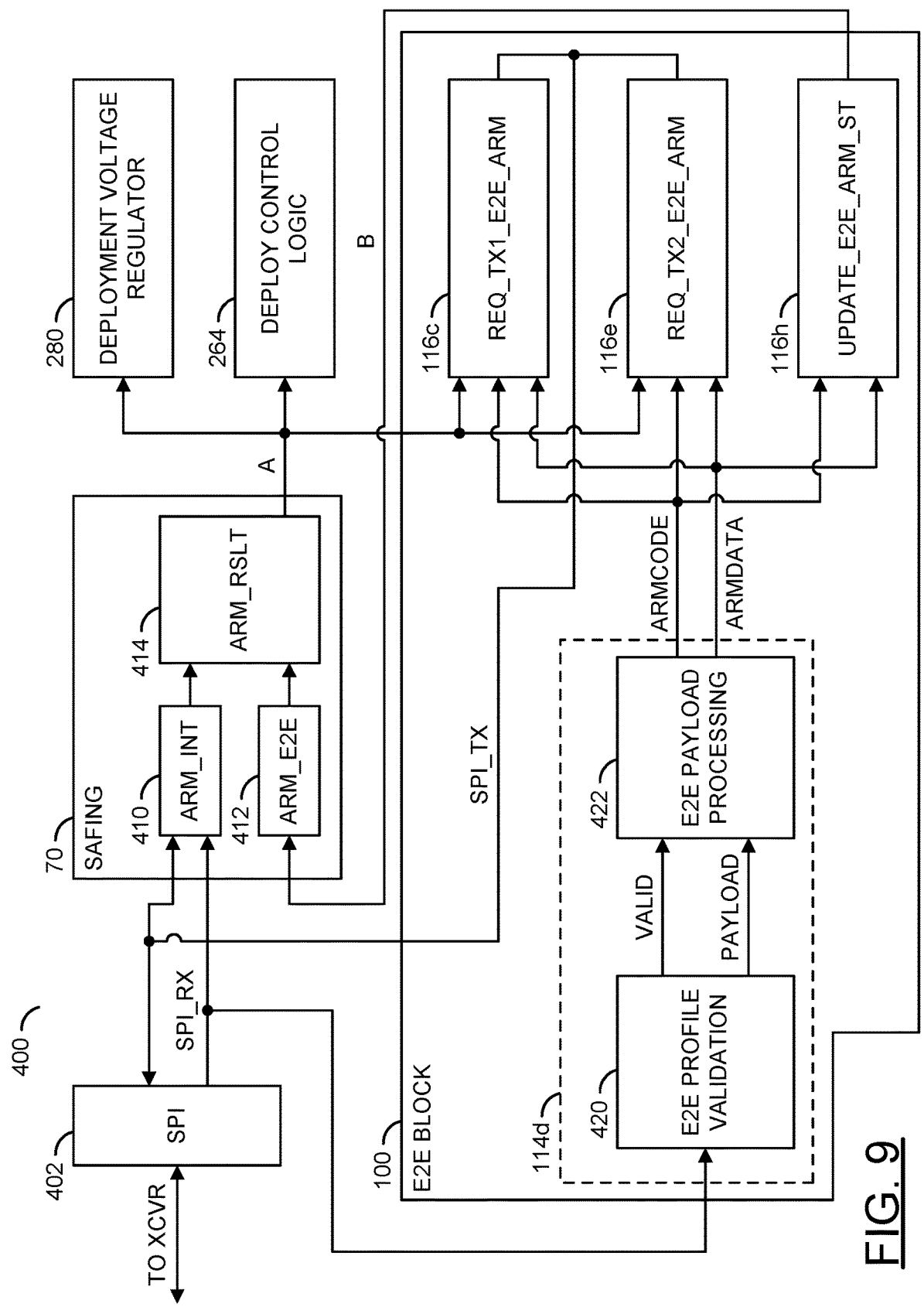
FIG. 9 is a block diagram illustrating an E2E module snooping a status of an arm signal.

Referring to FIG. 9, a block diagram illustrating an E2E module snooping a status of an arm signal is shown. A portion 400 of the ASIC 68 is shown. The portion 400 may comprise the safing module 70, the E2E module 100, the control logic 264, the voltage regulator 280 and/or a block (or circuit) 402. The circuit 402 may implement a communication module. The number, type and/or arrangement of the components of the portion 400 of the ASIC 68 may be varied according to the design criteria of a particular implementation.

The communication module 402 may be configured to send and/or receive data according to a particular communication and/or data format. In the example shown, the communication module 402 may implement SPI communication. The communication module 402 may be configured to exchange data with the transceiver 250b shown in association with FIG. 5. The communication module 402 may be configured to communicate data to the bus 56 and/or receive data from the bus 56. In some embodiments, the communication module 402 may be implemented as a part of the communication logic 102 of the E2E module 100. In the example shown in association with FIG. 7, the validation module 110 may be configured to perform the functionality of the communication module 402 in order to perform SPI validation (e.g., the correct number of SCLK, the parity, the address, etc.).

The communication module 402 may be configured to generate a signal (e.g., SPI_RX) and/or receive a signal (e.g., SPI_TX). In one example, the signal SPI_RX may comprise a version of the remote signal REM. For example, the signal SPI_RX may comprise a data payload sent by the pre-incident ECU 52 (as shown in association with FIG. 6). The communication module 402 may send the signal SPI_RX to the E2E module 100 and/or the safing module 70. In one example, the signal SPI_TX may comprise a version of the bypass signal B that may be used to generate the remote signal REM. For example, the signal SPI_TX may comprise a data payload generated by the E2E module 100. The communication module 402 may send the data payload from the signal SPI_TX to the post-incident ECU 52 (as shown in association with FIG. 5). The communication module 402 may be configured to generate and/or receive other signals (not shown). The number, type and/or data format of the signals communicated by the communication module 402 may be varied according to the design criteria of a particular implementation.

The communication module 402 may be configured to perform SPI validation for all SPI communications (e.g., whether used for E2E communications or not). The SPI validation process implemented by the communication module 402 may be configured to ensure that a correct number of edges matches a number of bits. The SPI validation may verify data integrity through parity checks and/or verify that data elements match the protocol. The SPI validation may be configured to enable/disable read/write access based on hardware state machine of the ASIC 68. Unlike other global SPI communication, the E2E messages communicated using the E2E module 100 may use an out-of-frame format.

The safing block 70 may comprise a block (or circuit) 410, a block (or circuit) 412 and/or a block (or circuit) 414.

The circuit 410 may implement an internal arming circuit. The circuit 412 may implement an E2E arming circuit. The circuit 414 may implement an arm result circuit. The safing block 70 may comprise other components (not shown). The number, type, functionality and/or arrangement of the components of the safing block 70 may be varied according to the design criteria of a particular implementation.

The internal arming circuit 410 may be configured to receive the signal SPI_TX and/or the signal SPI_RX. The internal arming circuit 410 may be configured to store an input that corresponds to generating the arm signal A based on data internal to the control unit 60. For example, the internal arming circuit 410 may be used to generate the arm signal A from sources other than the E2E module 100 (e.g., when the E2E module 100 is not operational, based on data received from the remote sensors 62, based on data from the central sensors 64, etc.). The internal arming circuit 410 may be provide an output to the arm result circuit 414.

The E2E arming circuit 412 may be configured to receive the bypass signal B. The E2E arming circuit 412 may be configured to store an input that corresponds to generating the arm signal A based on data from the E2E module 100. For example, the E2E module 100 may generate the bypass signal B in response to the signal REM received from the end device 52 and present the bypass signal B to the E2E arming circuit 412. The E2E arming circuit 412 may enable the safing block 70 to generate the arm signal A in response to E2E module 100. The E2E arming circuit 412 may provide an output to the arm result circuit 414.

The arm result circuit 414 may be configured to receive an output generated by the internal arming circuit 410 and/or the E2E arming circuit 412. The arm result circuit 414 may be configured to perform a logical OR operation on the output generated by the internal arming circuit 410 and the E2E arming circuit 412. The arm result circuit 414 may be configured to trigger the arm signal A in response to the logical OR operation. For example, if either the internal arming circuit 410 or the E2E arming circuit 412 has received data about generating an arm signal, the arm result circuit 414 may trigger the arm signal A. The arm signal A may be an output of the safing block 70. The arm signal A may be presented to each of the E2E module 100, the control logic 264 and the voltage regulator 280.

The arm request from a data payload may be passed to the safing block 70. The safing block may operate as a final handler (or arbitrator) of the arm signals. The safing block 70 may arbitrate the arm request(s) and generate the proper arm signal A. For example, any time the system (e.g., the control unit 60) arms, either by sensors (e.g., the remote sensors 62 or the central sensors 64), the final arm status may always be provided from the arm result circuit 414 (e.g., the output arm signal A). The arm signal A may be a common signal generated from the safing block 70 to the E2E module 100, the control logic 264 and the deployment voltage regulator 280.

The control logic 264 may receive the arm signal A from the safing block 70. The control logic 264 may be implemented as part of the ASIC hardware 68 of the control unit 60. The control logic 264 may have the direct inputs of all the ARM signals (e.g., the physical arm signals implemented by the control unit 60). The physical arm signals may be used by the control logic 264 as enablers of the deployment command (e.g., the signal ACT presented to the actuators 240).

The deployment voltage regulator 280 may receive the arm signal A from the safing block 70. The deployment voltage regulator 280 may be configured to enable the transistors 266a-266b and/or the transistor 282 (shown in association with FIG. 6).

The E2E module 100 may be configured to receive the signal SPI_RX and/or the arm signal A. The E2E module 100 may be configured to generate the bypass signal B and/or the signal SPI_TX. The arm signal A may be used as an input by the E2E module 100 to be able to support the request to generate E2E ARM TX messages 1 and 2 (e.g., SPI_TX). In an example, the signal SPI_TX may be used to provide the signal REM to the bus 56.

The E2E module 100 is shown comprising the payload extraction module 114d, the request arm transmit module 116c, the request arm transit module 116e and/or the update arm status module 116h. The E2E module 100 may comprise other components (e.g., as shown in association with FIG. 7). The payload extraction module 114d may comprise a block (or circuit) 420 and/or a block (or circuit) 422. The circuit 420 may comprise a profile validation module and/or a payload processing module. The payload extraction module 114d may further comprise the counter, circuitry for CRC checking and/or other circuitry/logic (not shown). The number, type and/or arrangement of the components of the payload extraction module 114d may be varied according to the design criteria of a particular implementation.

The payload extraction module 114d may receive the signal SPI_RX. In some embodiments, the payload extraction module 114d may receive a portion of the signal SPI_RX (e.g., a subset of all of the bits in an SPI signal). The signal SPI_RX may be an input to the profile validation module 420. The payload extraction module 114d may generate a signal (e.g., ARMCODE) and/or a signal (e.g., ARMDATA). The signal ARMCODE and the signal ARMDATA may both be provided to the request arm transmit module 116c, the request arm transit module 116e and the update arm status module 116h.

The profile validation module 420 may receive the signal SPI_RX. The profile validation module 420 may be configured to validate a payload based on a configured profile. The configured profile may be one of the supported AUTOSAR profiles. In one example, the profile may be a P1A profile or a P02 profile. Each of the supported profiles may comprise a particular specification for validating the payload and ensuring data coherency between the system 50 (e.g., the end device 52 and the E2E module 100). The validation performed by the profile validation module 420 (e.g., validation according to a profile) and the validation performed by the validation module 110 (e.g., validation for SPI) may be for different purposes. Upon validation of the E2E message by the profile validation module 420, the data payload may be completely validated and processed by the E2E module 100.

The profile validation module 420 may be configured to generate a signal (e.g., VALID) and a signal (e.g., PAYLOAD). The signal VALID and the signal PAYLOAD may be presented to the payload processing module 422. The signal VALID may operate as an enable signal. The signal VALID may be generated in response to the profile validation module 420 determining that the profile is valid (e.g., the data payload is formatted according to the selected profile). The signal PAYLOAD may comprise the validated payload data.

Both ends of the E2E communication must adhere to a common payload layout definition (e.g., according to the supported profiles) to ensure compatibility with the signal deployment chains. The profile validation module 420 may replace any unused bits within the data payload with a zero value. There may be up to 8 bits of the usable data field within the data payload. When the sending device (e.g., the end device 52 or the E2E module 100) sends an arm activation request, the sending device must continue to request the activation of the arm periodically (e.g., otherwise, the dwell period may expire and arm request may be deactivated).

The payload processing module 422 may generate the signal ARMCODE and the signal ARMDATA in response to the signal PAYLOAD when the signal VALID is asserted. The payload processing module 422 may be configured to use the data in the signal PAYLOAD to perform a CRC calculation and/or update the counter based on the selected profile. The payload processing module 422 may be configured to manage a data field (e.g., the signal ARMDATA) for each E2E message transmitted or received based on the configurable arming matrix. The signal ARMCODE may be used for mapping the E2E arm signal to a physical arm signal of the control unit 60. The signal ARMCODE may be used for activating one of the request arm transmit module 116c (e.g., to transmit E2E TX1) or the request arm transit module 116e (e.g., to transmit E2E TX2). For receiving an arm request, the signal ARMCODE may manage an 8-bit mask to select which bits of the arming message may be used as inputs. The signal ARMCODE may be used for activating the update arm status module 116h.

The request arm transmit module 116c may be configured to generate the signal SPI_TX in response to the signal ARMCODE, the signal ARMDATA and the arm signal A. Providing the arm signal A to the request arm transmit module 116c may enable the E2E module 100 to snoop a status of the arm signal A. For example, the arm transmit module 116c may transmit an E2E TX1 message comprising the data from the signal ARMDATA when the arm signal A is active and the signal ARMCODE enables the request arm transmit module 116c. The signal SPI_TX comprising the E2E TX1 message may be communicated to the bus 56 as the signal REM (e.g., to enable the end device 52 to activate the actuator 54).

The request arm transmit module 116e may be configured to generate the signal SPI_TX in response to the signal ARMCODE, the signal ARMDATA and the arm signal A. Providing the arm signal A to the request arm transmit module 116e may enable the E2E module 100 to snoop a status of the arm signal A. For example, the arm transmit module 116e may transmit an E2E TX2 message comprising the data from the signal ARMDATA when the arm signal A is active and the signal ARMCODE enables the request arm transmit module 116e. The signal SPI_TX comprising the E2E TX2 message may be communicated to the bus 56 as the signal REM (e.g., to enable the end device 52 to activate the actuator 54). The remote signal REM may comprise to arm transmit signals (e.g., E2E TX1 and E2E TX2). The E2E TX1 message and the E2E TX2 message may each be configured to provide the arm request to different end devices.

The update arm status module 116h may be configured to generate the bypass signal B in response to the signal ARMCODE and the signal ARMDATA. Providing the bypass signal B to the safing block 70 may enable the E2E module 100 to cause the arm signal A to be generated in response to the reception of a request (e.g., the signal REM communicated over the bus 56) by the end device 52. For example, the update arm status module 116h may communicate the bypass signal B comprising the data from the signal ARMDATA when the signal ARMCODE enables the update arm status module 116h.

The configuration and the generation of the arm signal generated by the E2E module 100 (e.g., the bypass signal B) may be completely operated by the E2E module 100 (e.g., not by the safing block 70). The bypass signal B may be passed to the safing block 70 (e.g., to the E2E arming circuit 412). The arm result circuit 414 may logically OR the signal B to generate the arm signal A.

Construction of the E2E message may be handled within the E2E module 100 (e.g., independent of the microcontroller 66) in order to validate and/or assign (or provide) the proper arming. The E2E message may comprise at least four elements that need to be exchanged for successful E2E communication (e.g., 8 bits of arm data, 4 bits of data ID, 4 bits for the counter and 8 bits for CRC). The full data ID may not be sent in the E2E message. The data ID may be configured during the initialization or diagnostic state and stored in the register map 104. The full data ID, the counter and the arm data may be used in the calculation of the CRC. The E2E module 100 may be configured to manage the counter and CRC fields of each protected E2E message.

Figure 10:
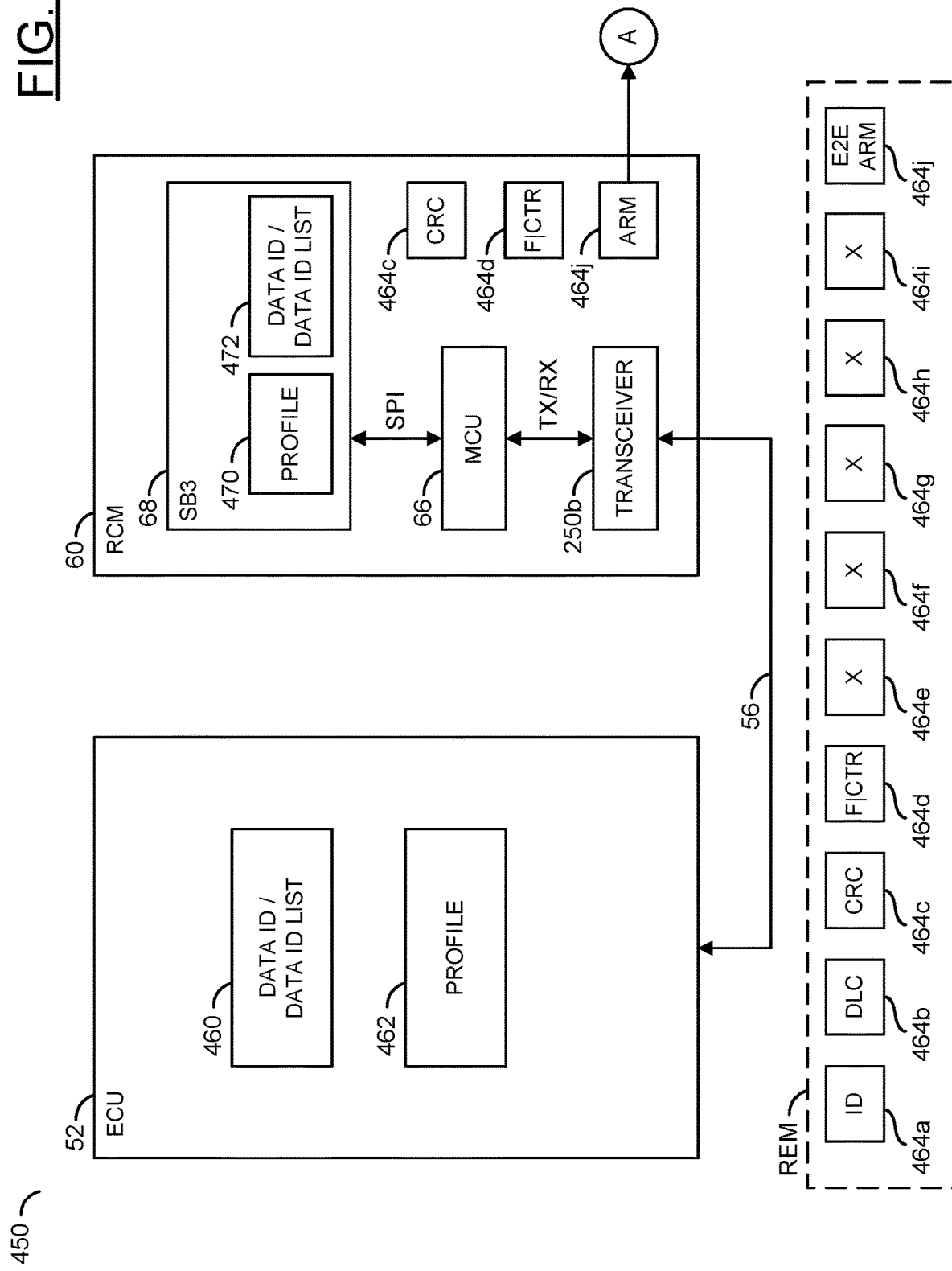
FIG. 10 is a block diagram illustrating a communication portion for a scalable configuration matrix.

Referring to FIG. 10, a block diagram illustrating a communication portion for a scalable configuration matrix is shown. A portion of a communication example 450 is shown. The communication example 450 may comprise the end device 52 communicating with the control module 60 over the bus 56. Another portion of the communication example 450 (to be described in association with FIG. 11) may further comprise an arm signal interface 452 and/or a configuration matrix 454.

The end device 52 is shown comprising a block (or circuit) 460 and/or a block (or circuit) 462. The block 460 may comprise a data ID list. The block 462 may comprise a profile. The blocks 460-462 may comprise data stored in a memory and/or register map of the end device 52 that may be used to configure the E2E communication. The data ID list 460 and the profile block 462 may be pre-configured (e.g., before communication over the bus 56) to enable data coherency between the end device 52 and the E2E module 100.

The signal REM may be communicated over the bus 56 (e.g., either from the end device 52 to the control module 60 or from the control module 60 to the end device 52). The signal REM may comprise message components 464a-464j. Each of the message components 464a-464j may comprise a number of bits or bytes of the communication of the signal REM. In the example shown, the message component 464a may comprise a data ID (e.g., 4-bits), the message component 464b may comprise a data length code (DLC) value, the message component 464c may comprise an E2E CRC value (e.g., 8-bits), the message 464d may comprise a counter value (e.g., 4-bits), the message components 464e-464i may comprise a data payload and the message component 464j may comprise arm data (e.g., 8-bits).

The microcontroller 66, the ASIC 68 and/or the transceiver 250b are shown within the control module 60. The transceiver 250b may transmit/receive the signal REM. The microcontroller 66 may generate an SPI formatted signal from the signal REM without touching the data payload. The ASIC 68 is shown comprising a block (or circuit) 470 and/or a block (or circuit) 472. The block 470 may comprise a data ID list. The block 472 may comprise a profile. The blocks 470-472 may comprise data stored by the register map 104 of the E2E module 100 that may be used to configure the E2E communication. The data ID list 470 and the profile block 472 may be pre-configured (e.g., in an initialization mode or a diagnostics mode of operation of the E2E module 100 before communication over the bus 56) to enable data coherency between the end device 52 and the E2E module 100.

The block 460 and the block 472 may provide two different configurations for data IDs. In some embodiments, the block 460 and the block 472 may implement a configurable static ID. In some embodiments, the block 460 and the block 472 may implement dynamic IDs through a data ID list. The E2E module 100 may be configured to support operations based on a static data ID and/or the dynamic data ID list. The E2E module 100 may enable the end device 52 to communicate with the ASIC 68 using either the static data ID or the dynamic data ID list without having the microcontroller 66 intervene or be able to change the data.

The E2E module 100 may be configured to format the signal message components 464a-464j for the signal REM and/or extract the message components 464a-464j from the signal REM. In the example shown, the CRC message component 464c, the counter message component 464d and/or the arm data component 464j are shown. For example, the message components 464a-464j may be formatted and/or extracted by the payload processing module 422 shown in association with FIG. 9. An illustrative example of a scalable configuration matrix for the arm data component 464j may be described in association with FIG. 11.

Figure 11:
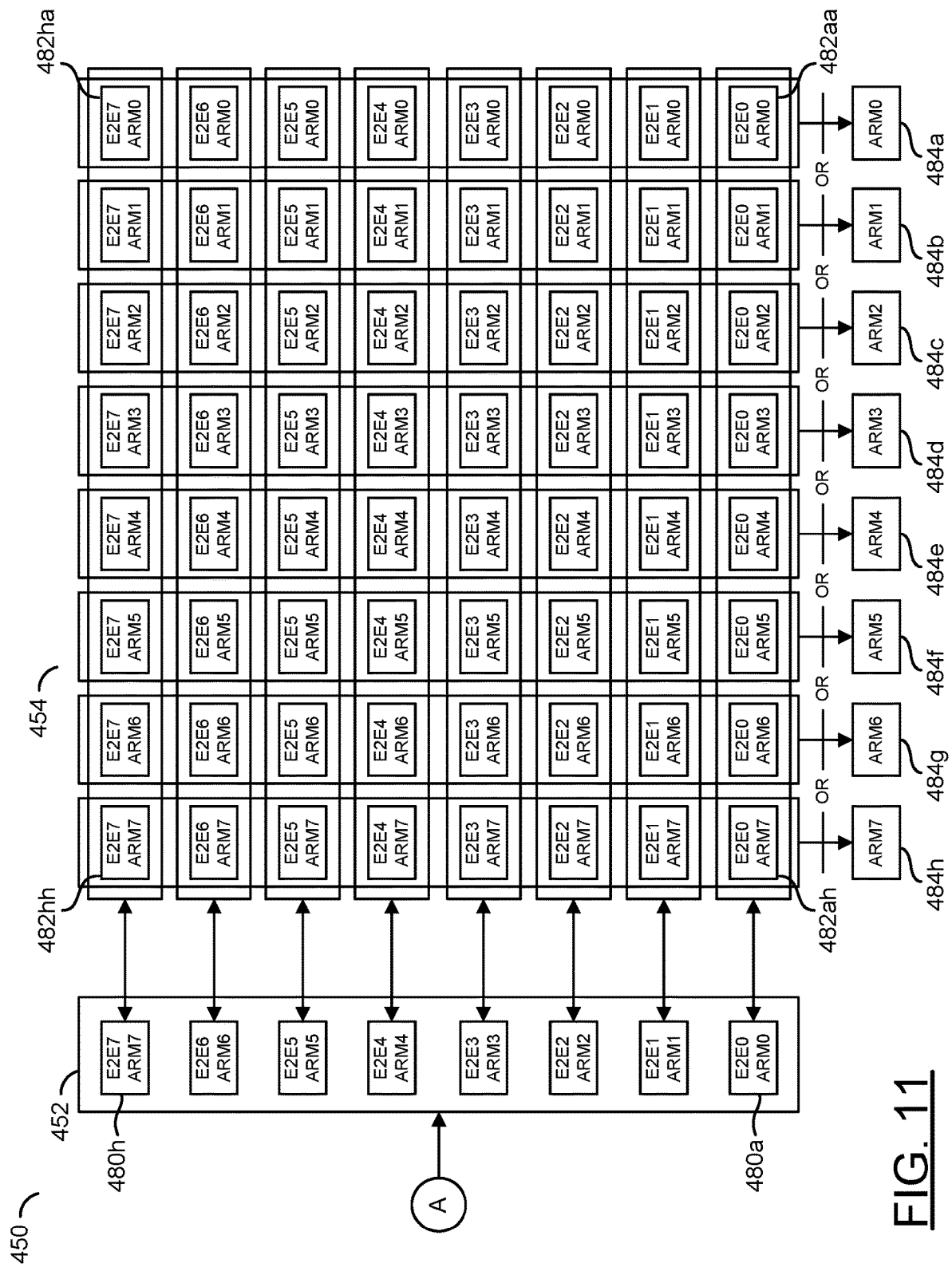
FIG. 11 is a block diagram illustrating a scalable configuration matrix.

Referring to FIG. 11, a block diagram illustrating a scalable configuration matrix is shown. A portion of the communication example 450 (partially shown in association with FIG. 10) is shown. The communication example 450 may comprise the arm signal interface 452 and/or the configuration matrix 454.

The arm signal interface 452 may receive the arm data component 464j. The arm signal interface 452 may comprise a number of E2E arm signals 480a-480h. In the example shown, the E2E module 100 may implement eight E2E arm signals 480a-480h. Other numbers of E2E arm signals 480a-480h may be implemented. The configuration registers 350a-350n may be configured to activate or deactivate any of the E2E arm signals 480a-480h. The E2E arm signals 480a-480h may be an interface between the external ECU 52 and the control unit 60.

The configuration matrix 454 may comprise a number of mappings 482aa-482hh. The configuration matrix 454 is shown between the arm signal interface 452 and physical arm signals 484a-484h. The physical arm signals 484a-484h may comprise arming signals that are within the control unit 60. In the example shown, there may be eight physical arm signals 484a-484h implemented by the control unit 60. Other numbers of physical arm signals 484a-484h may be implemented. The number of E2E arm signals 480a-480h may match the number of physical arm signals 484a-484h. The physical arm signals 484a-484h may be configured to physically enable the deployment path (e.g., for the activation signal ACT to activate the actuators 240 controlled by the control unit 60).

The mappings 482aa-482hh of the configuration matrix 454 may enable each of the E2E arm signals 480a-480h to be mapped to any of the physical arm signals 484a-484f. For example, the E2E arm signal 480a (e.g., E2E0) may be mapped to the physical arm signal 484h (e.g., ARM7) by the mapping 484ah, the E2E arm signal 480a (e.g., E2E0) may be mapped to the physical arm signal 484d (e.g., ARM3) by the mapping 484ad, the E2E arm signal 480h (e.g., E2E7) may be mapped to the physical arm signal 484a (e.g., ARM0) by the mapping 484ha, the E2E arm signal 480e (e.g., E2E4) may be mapped to the physical arm signal 484e (e.g., ARM4) by the mapping 484ee, etc. The various mappings implemented may be varied according to the design criteria of a particular implementation.

The mappings 482aa-482hh may be controlled by the configuration registers 350a-350n. In some embodiments, the E2E module 100 may be configured to activate one of the E2E arming signals 480a-480h and deactivate the rest of the E2E arming signals 480a-480h. In an example, the E2E arming signal 480a may be activated and mapped to any or all of the physical arming signals 484a-484h of the control module 60, while the other E2E arming signals (e.g., 480b-480h) are deactivated.

The register map 104 may be configured to control the assignment of the mapping of the E2E arm signals 480a-480h to the physical arm signals 484a-484h. The register map 104 may implement the configuration matrix 454 to configure any one of the E2E ARM signals 480a-480h to any combination of the internal physical ARM signals 484a-484h. The register map 104 may enable a configuration of each E2E ARM signal activation for TX1/TX2/RX (e.g., mutually exclusive). The register map 104 may enable a configuration of the data ID used for each profile and/or configuration of a data ID list.

In one example, the E2E module 100 may be configured to manage eight E2E protected received arming messages (e.g., the E2E arm signals 480a-480h). The configuration matrix 454 may use the data field (e.g., the data ID message component 464a) of each received E2E arm signal (e.g., 480a-480h). For each of the E2E arming signals 480a-480h, the configuration matrix 454 may manage the mappings 482aa-482hh that may comprise an 8-bit mask to select which bits of the arming message may be used as inputs. In one example, by default, all bits may be masked (e.g., inhibited). The configuration matrix 454 may be configured to judge external arming sources only while in a safing state.

The configuration matrix 454 may enable the arm distribution of the E2E module 100 to be highly scalable. The arm control path 70 may be highly configurable such that the ASIC 68 may operate differently for different use cases. In one example, the ASIC 68 may be configured to be operational for standard deployment of the actuator 58 (e.g., operate with E2E disabled). In another example, the ASIC 68 may be configured to be operational using the E2E module 100 to receive a request to deploy using information (e.g., the signal REM) from the end device 52. In yet another example, the ASIC 68 may be configured to be operational using the E2E module 100 to send a request to deploy to the end device 52 (e.g., the signal REM) based on snooping the status of the arm signal A. The register map 104 may enable the E2E module to be highly configurable with respect to the different use cases. The E2E module 100 may be configured to operate using profiles for existing standards to enable the ASIC 68 to be compatible with end devices that are already on the market. In an example, to support the end device 52 (or for the end device 52 to support the E2E module 100), both devices may be configured to support the same profile to be able to communicate (e.g., compatible signal deployment chains).

Figure 12:
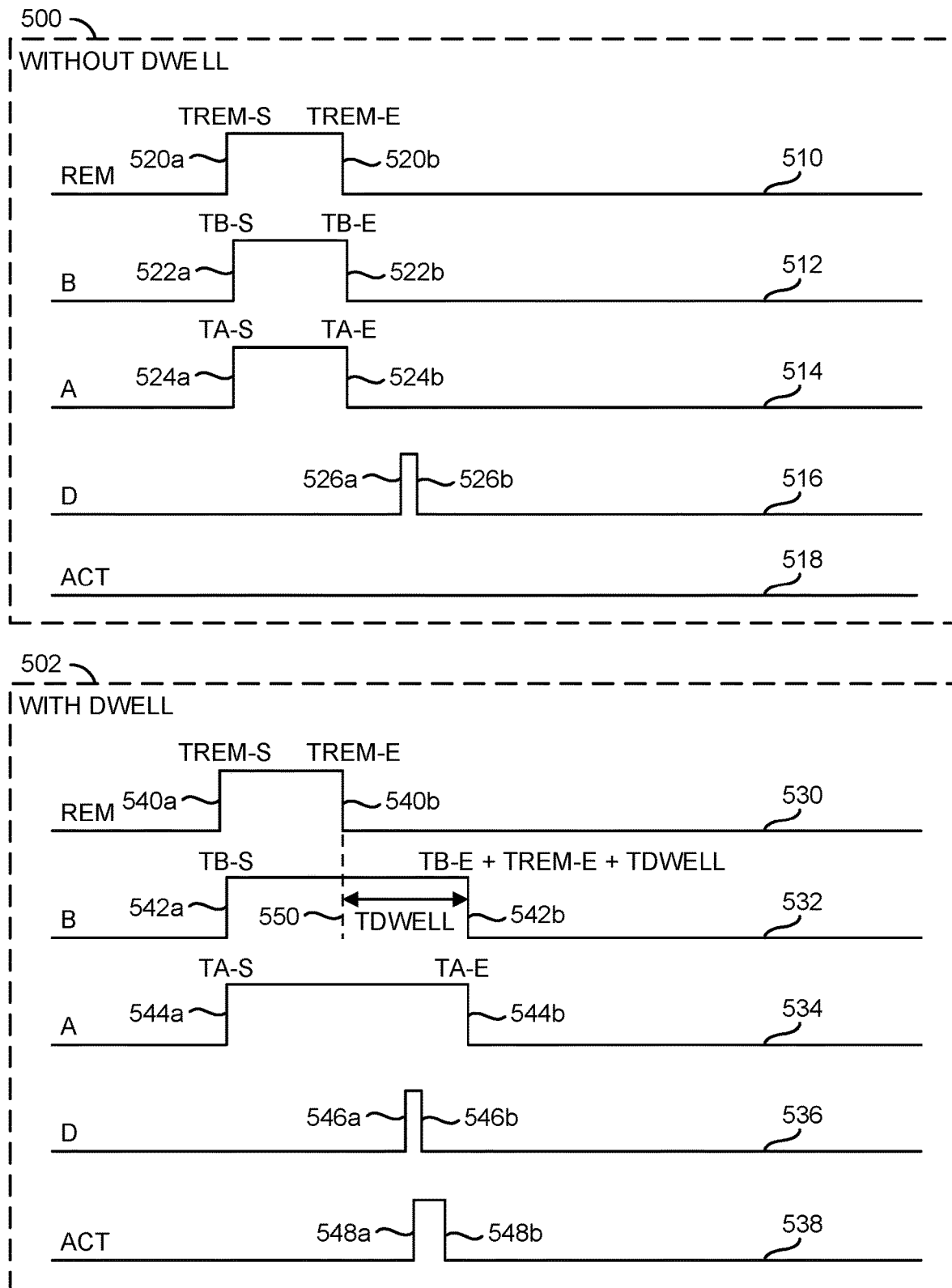
FIG. 12 is a diagram illustrating timing graphs for arm dwell time for various signals.

Referring to FIG. 12, a diagram illustrating timing graphs for arm dwell time for various signals is shown. A timing diagram 500 and a timing diagram 502 are shown. The timing diagram 500 may comprise various signals without arm dwell enabled. The timing diagram 502 may comprise various signals with arm dwell enabled.

The timing diagram 500 may comprise a number of signals 510-518. The signal 510 may correspond to the remote signal REM. The signal 512 may correspond to the bypass signal B. The signal 514 may correspond to the arm signal A. The signal 516 may correspond with the deploy signal D. The signal 518 may correspond to the activation signal ACT. The signals 510-518 in the timing diagram 500 may illustrate an example of implementing the E2E module 100 without the arm dwell time configured properly.

The REM signal 510 may represent a request by the end device 52 over the bus 56 that may be used by the ASIC 68 to deploy the actuator 58. The REM signal 510 may comprise a rising edge 520a and a falling edge 520b. The rising edge 520a may represent a start time of a remote request and the falling edge 520b may represent an end time of a remote request. In an example, the end device 52 (e.g., implementing a radar ECU) may request activation of arming at the rising edge 520a and request deactivation of arming at the falling edge 520b.

The B signal 512 may represent a response by the E2E module 100 to the remote signal REM. For example, the E2E module 100 may respond to the signal REM by generating the bypass signal B. The B signal 512 may comprise a rising edge 522a and a falling edge 522b. The rising edge 522a may occur at approximately the same time (e.g., slightly after) the rising edge 520a of the REM signal 510 and the falling edge 522b may occur at approximately the same time (e.g., slightly after) the falling edge 520b of the REM signal 510.

The A signal 514 may represent a response by the safing block 70 to the bypass signal B. For example, the safing block 70 may respond to the bypass signal B by generating the arm signal A (e.g., as shown in association with FIG. 9). The A signal 514 may comprise a rising edge 524a and a falling edge 524b. The rising edge 524a may occur at approximately the same time (e.g., slightly after) the rising edge 522a of the B signal 512 and the falling edge 524b may occur at approximately the same time (e.g., slightly after) the falling edge 522b of the B signal 512.

The D signal 516 may represent a generation of the deployment signal D by the microcontroller 66 (e.g., as shown in association with FIG. 6). The D signal 516 may be asynchronous with the E2E module 100 and/or the generation of the bypass signal B and the arm signal A. The D signal 516 may comprise a rising edge 526a and a falling edge 526b. The rising edge 526a and the falling edge 526b may occur after the falling edge 524b of the A signal 514.

The ACT signal 518 may represent a generation of the activation signal ACT by the transistors 266a-266b (e.g., as shown in association with FIG. 6). The signal ACT may be used to deploy the actuator 58. The ACT signal 518 may only be asserted when the A signal 514 and the D signal 516 are both asserted. Since the range from the rising edge 526a to the falling edge 526b of the D signal 516 does not overlap the range from the rising edge 524a to the falling edge 524b of the A signal 514, the ACT signal 518 may not be asserted.

The ASIC 68 may independently generate the arm signal A. The deploy signal D may be independently generated by the microcontroller 66. The arm signal A may be used to enable the deployment voltage regulator 280 (e.g., the power supply transistor 282 for the transistors 266a-266b) and the control logic 264 to accept the deployment command (e.g., the deploy signal D) from the microcontroller 66. The arm signal A may be completely driven by sources external to the microcontroller 66 (e.g., the end device 52, the remote sensors 62, the central sensors 64, the safing block 70, the E2E module 100, etc.). Since the arm signal A is driven by sources external to the microcontroller 66, the conditions for activating the arm signal A may be asynchronous to the microcontroller 66.

As shown in the timing diagram 500, the sources external to the microcontroller 66 (e.g., the signals 510-514) may change the arm status (e.g., from activated back to deactivated) before the microcontroller 66 has taken the action to generate the deploy signal D. If the microcontroller 66 does not take action by generating the deploy signal D in time, the commands from the signal REM will not be honored by the ASIC 68. For example, a race condition may occur due to the nature of the asynchronous behavior between external sources for the arm signal A and the microcontroller 66.

In one example, if the time (e.g., dT) between the rising edge 520a and the falling edge 520b is enough to allow the microcontroller 66 to take further actions and command deployment (if warranted) then there may not be an issue (e.g., the time between the asserted edges 526a-526b of the D signal 516 may overlap with the time between the asserted edges 524a-524b of the A signal) and the ACT signal 518 may be generated as desired. In the example shown, since the time (e.g., dT) between the rising edge 520a and the falling edge 520b is not enough to allow the microcontroller 66 to take further actions and command deployment (if warranted), then the arming may be deactivated prior to the microcontroller 66 generates the deploy signal D (e.g., the time between the asserted edges 526a-526b of the D signal 516 does not overlap with the time between the asserted edges 524a-524b of the A signal) and the requested actions will not be honored by the deployment control logic 264 and the deployment voltage regulator 280.

To prevent the race condition, the register map 104 may implement one or more of the configuration registers 350a-350n that may enable the ASIC 68 to dwell the activation of the arm signal A beyond the external condition that drove the arm signal A. An amount of time (e.g., tDWELL) may be configured (e.g., in milliseconds) by setting the appropriate one or more of the configuration registers 350a-350n. Based on the time tDWELL, the arm signal A may remain active for an additional amount of time. The timing diagram 502 may illustrate the signals shown in the timing diagram 500 but with the tDWELL implemented.

The timing diagram 502 may comprise a number of signals 530-538. The signal 530 may correspond to the remote signal REM. The signal 532 may correspond to the bypass signal B. The signal 534 may correspond to the arm signal A. The signal 536 may correspond with the deploy signal D. The signal 538 may correspond to the activation signal ACT. The signals 530-538 may generally correspond to the same signals 510-518 shown in the timing diagram 500. The signals 530-538 may illustrate an example of implementing the E2E module 100 with the arm dwell time configured properly.

The REM signal 530 may comprise a rising edge 540a and a falling edge 540b. The rising edge 540a and the falling edge 540b may be similar to the rising edge 520a and the falling edge 520b shown in the timing diagram 500 (e.g., a start and end time of a remote request). The B signal 532 may comprise a rising edge 542a and a falling edge 542b. The rising edge 542a may be generated by the E2E module 100 at approximately the same time as the rising edge 540a of the REM signal 530. The falling edge 542b may occur the time tDWELL after the falling edge 540b of the REM signal 530.

The A signal 534 may be generated by the safing block 70 in response to the bypass signal B. The A signal 534 may comprise a rising edge 544a and a falling edge 544b. The rising edge 544a may be generated at approximately the same time (e.g., shortly after) the rising edge 542a of the B signal 532. The falling edge 544b may generated at approximately the same time (e.g., shortly after) the falling edge 542b of the B signal 532. The falling edge 542b may occur at least the time tDWELL after the falling edge 540b of the REM signal 530.

The D signal 536 may be similar to the D signal 516. A rising edge 546a and a falling edge 546b may occur with similar timings as the rising edge 526a and the falling edge 526b shown for the D signal 516 in the timing diagram 500. Since the range of time between the rising edge 544a and the falling edge 544b of the A signal 534 has been extended by the time tDWELL, the assertion of the A signal 534 and the D signal 536 may overlap.

The ACT signal 538 may be asserted in response to both the A signal 534 and the D signal 536 being asserted at the same time. The ACT signal 538 may comprise a rising edge 548a and a falling edge 548b. The actuator 58 may be generated in response to the rising edge 548a of the ACT signal 538. The rising edge 548a of the ACT signal 538 may be generated in response to the rising edge 546a of the D signal 536 being asserted during the time range between the rising edge 544a and the falling edge 544b of the A signal 534.

A dotted line 550 is shown extending down from the falling edge 540d of the REM signal 530. The dotted line 550 may indicate where the falling edge of the B signal 532 would occur without the tDWELL being configured. The time tDWELL may extend the amount of time that the bypass signal B is asserted beyond the remote signal REM used by the E2E module 100 to drive the bypass signal B. Since the arm signal A may be driven by the bypass signal B, the arm signal A may also be extended by the time tDWELL.

By configuring the arm dwell time, the arm signal A may remain active for the additional amount of time tDWELL. In the timing diagram 502, the length of time that the arm signal A may be extended by the time tDWELL to enable the microcontroller 66 to take action by generating the deploy signal D in time. By extending the arm signal A beyond the time that the signal that drove the arm signal A was active (e.g., the signal REM), the E2E module 100 may ensure that the request from the end device 52 is properly acted upon by the ASIC 68.

The arm dwell time may be configured according to the values in the status registers 352a-352n implementing the E2E RX CFG timers. The arm dwell time may be configured independently for each of the E2E arm signals 480a-480n. The arm dwell time may be set to 0 ms, 32 ms, 256 ms, 2048 ms, etc. The arm dwell time (e.g., TDWELL) may be selected based on the use case the E2E module 100 may be supporting (e.g., the use case relevant to a particular crash type). In one example, a front impact may last longer than a side impact. In another example a roll impact event may last longer than both a front impact and a side impact. Arming may be active at a start of the event and deployments of the actuators (e.g., the actuator 54, the actuator 58, etc.) may occur at different intervals throughout the impact event. In order to avoid interruptions to sending a deployment command to the actuators 240, the arm dwell time may be selected to last for the entire crash event type. The amount of time for each arm dwell time and/or the arm dwell time selected for each type of impact event may be varied according to the design criteria of a particular implementation.

Figure 13:
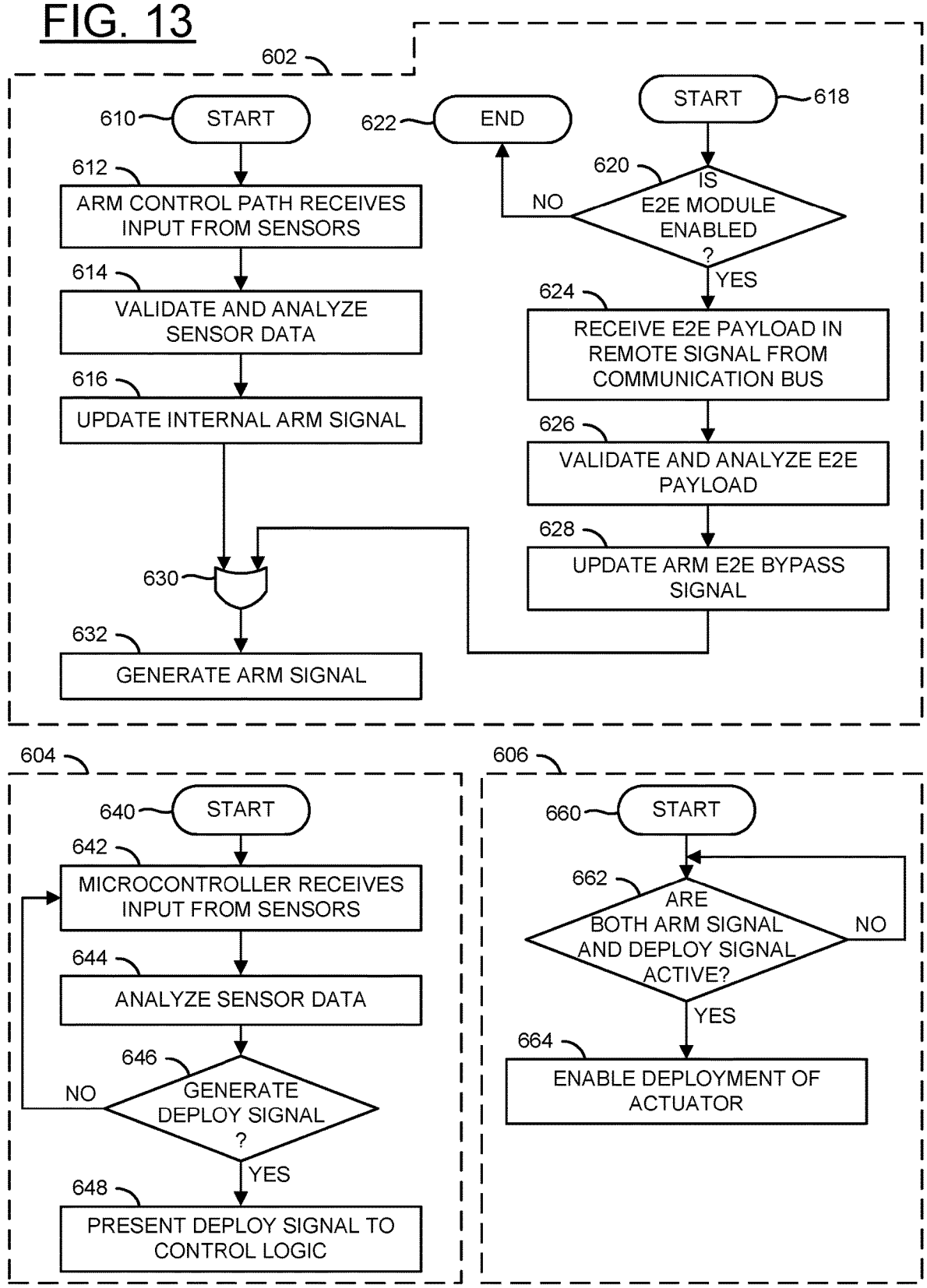
FIG. 13 is a flow diagram illustrating a method for enabling deployment of an actuator using ASIC hardware comprising built-in end-to-end communication protection.

Referring to FIG. 13, a method (or process) 600 is shown. The method 600 may enable deployment of an actuator using ASIC hardware comprising built-in end-to-end communication protection. The method 600 may comprise multiple sub-processes 602, 604 and/or 606. The sub-processes 602, 604 and/or 606 may operate independent of each other. The sub-processes 602 may be configured to generate the arm signal A. The sub-processes 604 may be configured to generate the deploy signal D. The sub-processes 606 may be configured to generate the activation signal ACT.

The sub-process 602 may comprise a step (or state) 610, a step (or state) 612, a step (or state) 614, a step (or state) 616, a step (or state) 618, a decision step (or state) 620, a step (or state) 622, a step (or state) 624, a step (or state) 626, a step (or state) 628, a step (or state) 630 and/or a step (or state) 632.

The step 610 may start the sub-process 602. The steps 602-616 may comprise steps for determining a status of the internal arm signal. In the step 612, the arm control path 70 (e.g., the safing block 70) may receive input from various sensors (e.g., the remote sensors 62 and/or the central sensors 64). Next, in the step 614, the sensor data may be validated and/or analyzed. In one example, the sensor data may be validated and/or analyzed by the communication module 402 and communicated to the internal arming circuit 410. In the step 616, the internal arming circuit 410 may update the status of the internal arm signal (e.g., present an output to the arm result circuit 414). Next, the sub-process 602 may move to the step 632.

The step 618 may also start the sub-process 602. The steps 618-628 may comprise steps for determining a status of the E2E arm signal (e.g., the bypass signal B). In an example, the steps 610-616 may operate independently (e.g., in parallel) with the steps 618-628 of the sub-process 602. Next, the sub-process 602 may move to the decision step 620. In the decision step 620, the E2E module 100 may determine whether activation of the arm signal A in response to an external E2E arm signal has been enabled. In an example, reception of external E2E arm signals may be enabled based on the configuration of the configuration register sets 120a-120n. If the E2E module 100 does not have E2E arm reception enabled, then the sub-process 602 may move to the step 622. In the step 622, the sub-process 602 may end the branch comprising the steps 618-628 (e.g., the arm signal A may only be generated by the internal arm signal from the steps 610-616). In the decision step 620, if the E2E module 100 does have E2E arm reception enabled, then the sub-process 602 may move to the step 624.

In the step 624, the E2E module 100 may receive the E2E payload in the remote signal REM (e.g., received via the communication bus 56). Next, in the step 626, the E2E module 100 may validate and/or analyze the E2E payload. For example, the payload extraction module 114d may perform validation (e.g., via the profile validation module 420) of the remote signal REM and the payload processing module 422) may perform data processing of the data payload. In the step 628, the E2E module 100 may update the E2E bypass signal B. For example, the update arm status module 116h may present the bypass signal B to the E2E arming circuit 412. The E2E arming circuit 412 may present the bypass signal B to the arm result circuit 414. Next, the sub-process 602 may move to the step 630.

The step 630 may provide a logical OR operation. For example, the arm result circuit 414 may perform a logical OR operation of the internal arm signal that may be presented by the internal arming circuit 410 and the bypass signal B that may be presented by the E2E arming circuit 412. Next, in the step 632, the arm result circuit 414 may generate the arm signal A. For example, the arm result circuit 414 may update the arm signal A if the internal arm signal or the bypass signal B is active. The arm signal A may be presented to the E2E module 100, the control logic 264 and the deployment voltage regulator 280. The sub-process 602 may continually update the arm signal A as new data is received.

The sub-processes 604 may comprise a step (or state) 640, a step (or state) 642, a step (or state) 644, a decision step (or state) 646, and/or a step (or state) 648.

The step 640 may start the sub-process 604. In the step 642, the microcontroller 66 may receive input from the sensors (e.g., the remote sensors 62, the central sensors 64 and/or receive data over the bus 56). Next, in the step 644, the microcontroller 66 may analyze the sensor data. Next, the sub-process 604 may move to the decision step 646.

In the decision step 646, the microcontroller 66 may determine whether to generate the deploy signal D. The microcontroller 66 may perform an independent analysis for generating the deploy signal D from the analysis performed for generating the arm signal A. If the microcontroller 66 determines to not deploy the control signal D, then the sub-process 604 may return to the step 642. If the microcontroller 66 does determine to deploy the deploy signal D, then the sub-process 604 may move to the step 648. In the step 648, the microcontroller 66 may present the deploy signal D to the control logic 264. The sub-process 604 may continually update the deploy signal D as new data is received.

The sub-processes 606 may comprise a step (or state) 660, a decision step (or state) 662, and/or a step (or state) 664. The step 660 may start the sub-process 606. Next, in the decision step 662, the control logic 264 and/or the transistors 266a-266b may determine whether both the arm signal A and the deploy signal D are active. If either one of the arm signal A or the deploy signal D are not active, then the sub-process 606 may return to the decision step 662. If both the arm signal A and the deploy signal D are active at the same time, then the sub-process 606 may move to the step 664.

In the step 664, the control logic 264 and/or the transistors 266a-266b may generate the activation signal ACT. The activation signal ACT may enable deployment of the actuator 58. The sub-process 606 may continually update the activation signal ACT in response to the arm signal A and the deploy signal D.

Figure 14:
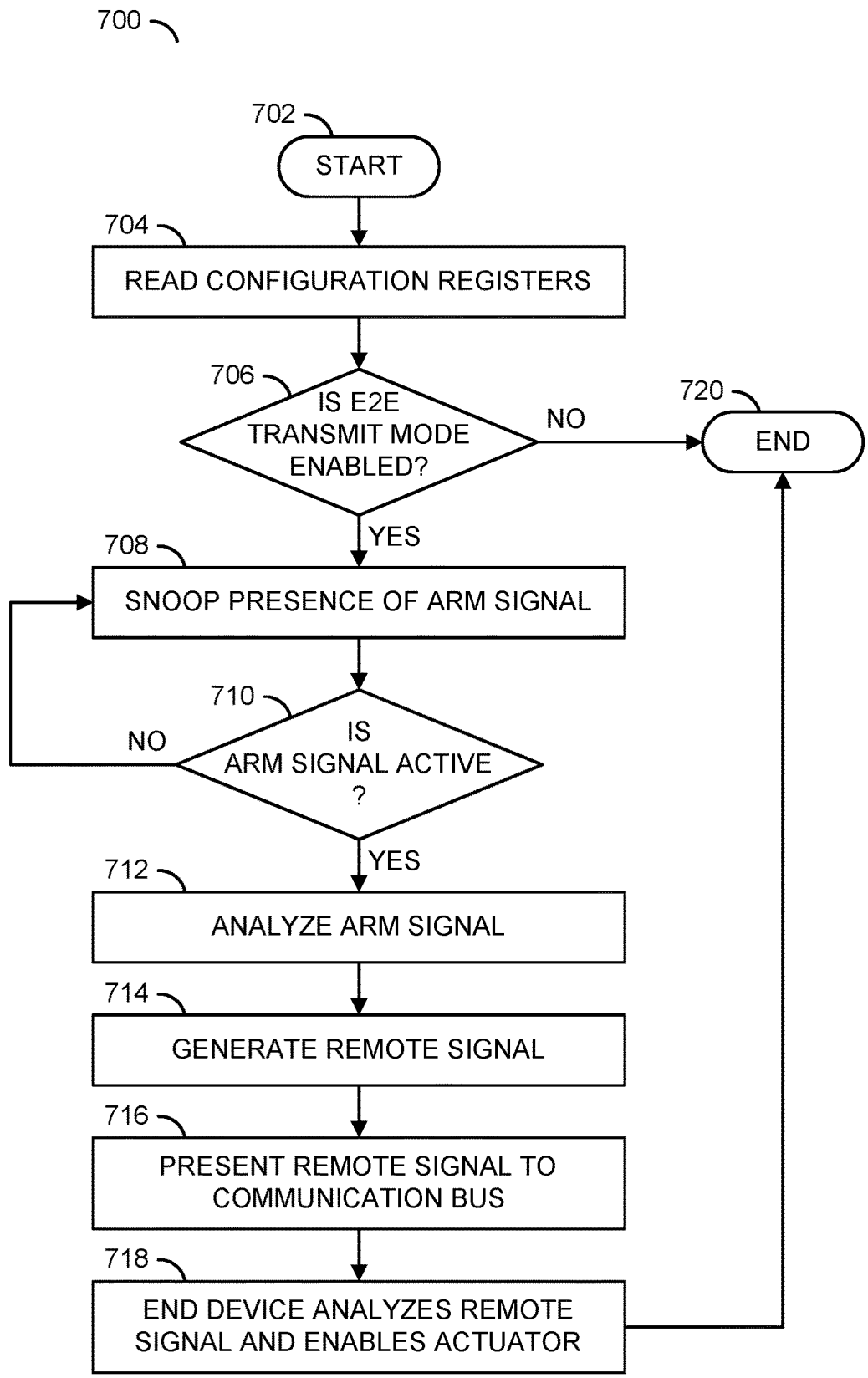
FIG. 14 is a flow diagram illustrating a method for transmitting an arm request to an end device over a communication bus.

Referring to FIG. 14, a method (or process) 700 is shown. The method 700 may transmit an arm request to an end device over a communication bus. The method 700 generally comprises a step (or state) 702, a step (or state) 704, a decision step (or state) 706, a step (or state) 708, a decision step (or state) 710, a step (or state) 712, a step (or state) 714, a step (or state) 716, a step (or state) 718, and a step (or state) 720.

The step 702 may start the method 700. In the step 704, the microcontroller 66 and/or the E2E module 100 may read the configuration register sets 120a-120n. For example, the E2E module 100 may initialize the communication logic 102 in response to the data stored in the configuration register sets 120a-120n. Next, the method 700 may move to the decision step 706.

In the decision step 706, the E2E module 100 and/or the ASIC 68 may determine whether the E2E transmit mode of operation is enabled. If the E2E transmit mode of operation is disabled, then the method 700 may move to the step 720. If the E2E transmit mode of operation is enabled, then the method 700 may move to the step 708. In the step 708, the E2E module 100 may snoop the presence and/or status of the arm signal A. For example, the request arm transmit module 116c and the request arm transmit module 116e may each receive the arm signal A from the arm result circuit 414. Next, the method 700 may move to the decision step 710.

In the decision step 710, the E2E module 100 may determine whether the arm signal A is active. If the arm signal A is not active, then the method 700 may return to the step 708. If the arm signal A is active, then the method 700 may move to the step 712.

In the step 712, the request arm transmit module 116c and the request arm transmit module 116e may analyze the arm signal A. Next, in the step 714, the request arm transmit module 116c or the request arm transmit module 116e may generate the remote signal REM. In an example, the request arm transmit module 116c or the request arm transmit module 116e may present the signal SPI_TX (e.g., comprising a TX1 or a TX2 transmission) to the communication module 402 and the communication module 402 may package the signal SPI_TX as the signal REM for the transceiver 250b. In the step 716, the transceiver 250b may send the signal REM over the bus 56. Next, in the step 718, the end device 52 may analyze the remote signal REM and enable the actuator 54. For example, the end device 52 may perform an analysis of the remote signal REM to determine whether to activate the actuator 54. Next, the method 700 may move to the step 720. The step 720 may end the method 700.

Figure 15:
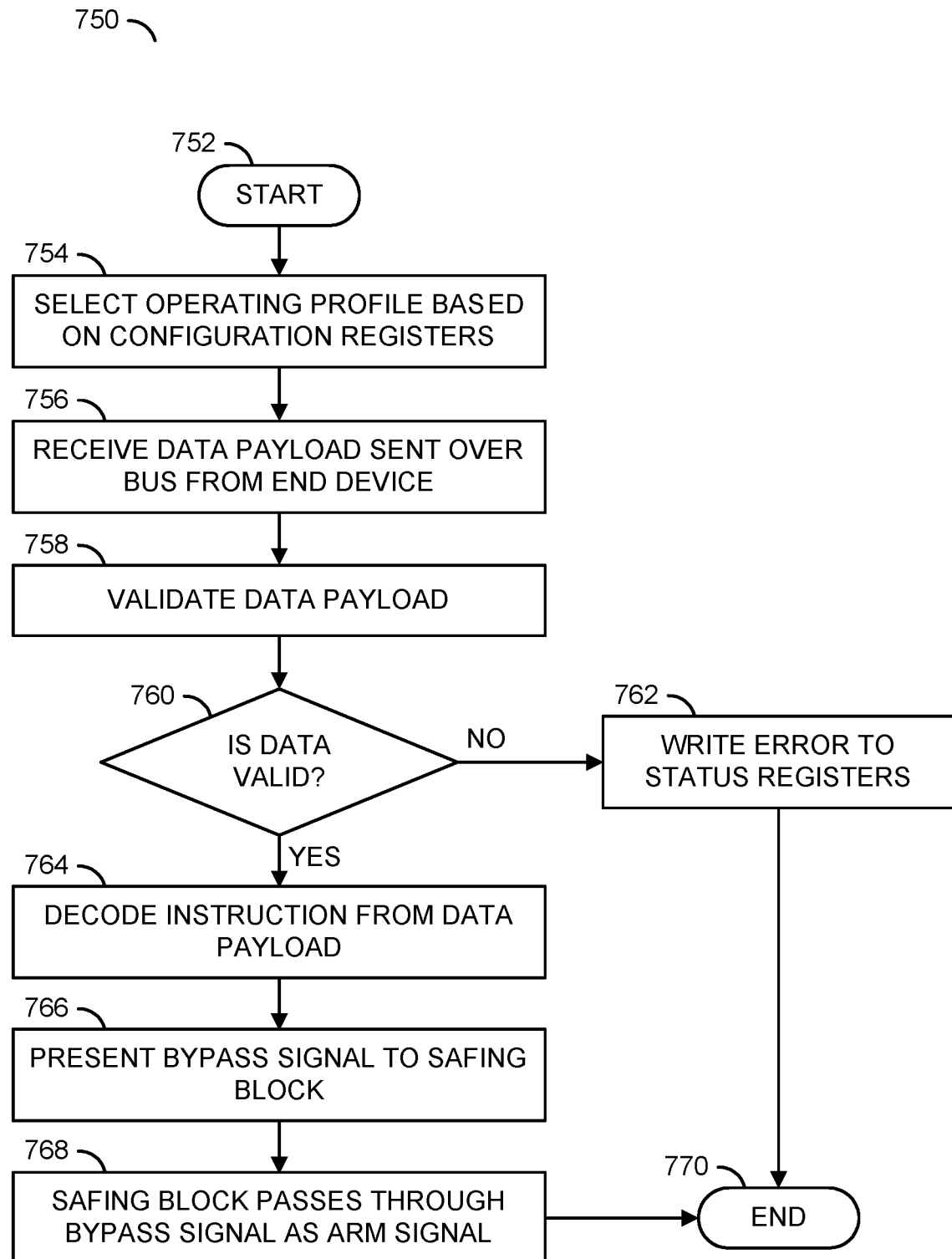
FIG. 15 is a flow diagram illustrating a method for generating an arm signal in response to receiving an arm request from an end device over a communication bus.

Referring to FIG. 15, a method (or process) 750 is shown. The method 750 may generate an arm signal in response to receiving an arm request from an end device over a communication bus. The method 750 generally comprises a step (or state) 752, a step (or state) 754, a step (or state) 756, a step (or state) 758, a decision step (or state) 760, a step (or state) 762, a step (or state) 764, a step (or state) 766, a step (or state) 768, and a step (or state) 770.

The step 752 may start the method 750. In the step 754, the E2E module 100 may select an operating profile based on the configuration register sets 120a-120n. Next, in the step 756, the E2E module 100 may receive the data payload sent over the bus 56 by the end device 52. The end device 52 may present the signal REM to the transceiver 250b, the communication module 402 may generate the signal SPI_RX in response to the signal REM and the signal SPI_RX may be presented to the payload extraction module 114d of the E2E module 100. In the step 758, the profile validation module 420 may validate the data payload received from the end device 52. Next, the method 750 may move to the decision step 760.

In the decision step 760, the profile validation module 420 may determine whether the data is valid. In an example, the profile validation module 420 may determine whether the data payload is provided in accordance with the selected profile. If the data is not valid, then the method 750 may move to the step 762. In the step 762, the E2E module 100 may write the error to the status register sets 122a-122n. Next, the method 750 may move to the step 770. In the decision step 760, if the data is valid, then the method 750 may move to the step 764.

In the step 764, the payload processing module 422 and/or the update arm status module 116h may decode the instruction from the data payload. Next, in the step 766 the update arm status module 116h may present the bypass signal B to the safing block 70. In the step 768, the safing block 70 may pass through the bypass signal B as the arm signal A. Next, the method 750 may move to the step 770. The step 770 may end the method 750.

Figure 16:
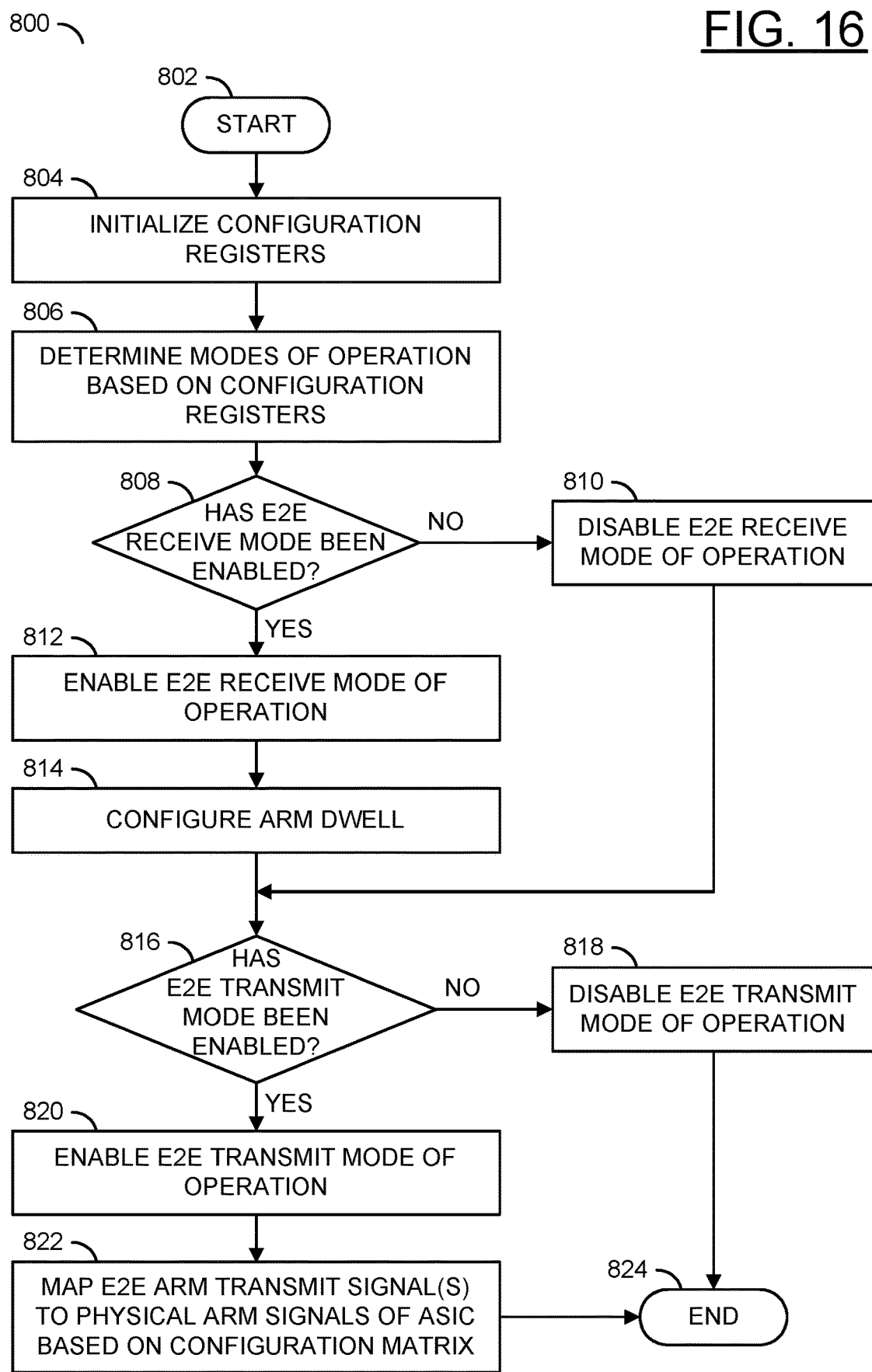
FIG. 16 is a flow diagram illustrating a method for enabling/disabling an E2E transmit mode and an E2E receive mode.

Referring to FIG. 16, a method (or process) 800 is shown. The method 800 may enable/disable an E2E transmit mode and an E2E receive mode. The method 800 generally comprises a step (or state) 802, a step (or state) 804, a step (or state) 806, a decision step (or state) 808, a step (or state) 810, a step (or state) 812, a step (or state) 814, a decision step (or state) 816, a step (or state) 818, a step (or state) 820, a step (or state) 822, and a step (or state) 824.

The step 802 may start the method 800. In the step 804, the microcontroller 66 and/or the ASIC 68 may initialize the configuration register sets 120*a*-120*n*. Next, in the step 806, the E2E module 100 may determine the modes of operation to activate based on the states of the various configuration register sets 120*a*-120*n*. For example, an E2E transmit mode of operation and the E2E receive mode of operation may be activated or deactivated independently from each other. Next, the method 800 may move to the decision step 808.

In the decision step 808, the E2E module 100 and/or the ASIC 68 may determine whether the E2E receive mode of operation has been enabled. If the E2E receive mode of operation has not been enabled, then the method 800 may move to the step 810. In the step 810, the E2E module 100 may disable the E2E receive mode of operation. Next, the method 800 may move to the decision step 816. In the decision step 808, if the E2E receive mode of operation has been enabled, then the method 800 may move to the step 812. In the step 812, the E2E module 100 may enable the E2E receive mode of operation. Next, in the step 814, the E2E module 100 may configure the arm dwell time (e.g., based on the configuration register sets 120*a*-120*n* and/or the status register sets 122*a*-122*n*). Other features and/or settings of the E2E receive mode of operation may be configured. Next, the method 800 may move to the decision step 816.

In the decision step 816, the E2E module 100 and/or the ASIC 68 may determine whether the E2E transmit mode of operation has been enabled. If the E2E transmit mode of operation has not been enabled, then the method 800 may move to the step 818. In the step 818, the E2E module 100 may disable the E2E transmit mode of operation. Next, the method 800 may move to the step 824. In the decision step 816, if the E2E transmit mode of operation has been enabled, then the method 800 may move to the step 820. In the step 820, the E2E module 100 may enable the E2E transmit mode of operation. Next, in the step 822, the E2E module 100 may map the E2E arm signals 480*a*-480*h* to the physical arm signals 484*a*-484*h* of the ASIC 68 using the configuration matrix 454. Other features and/or settings of the E2E transmit mode of operation may be configured. Next, the method 800 may move to the step 824. The step 824 may end the method 800.

Figure 17:
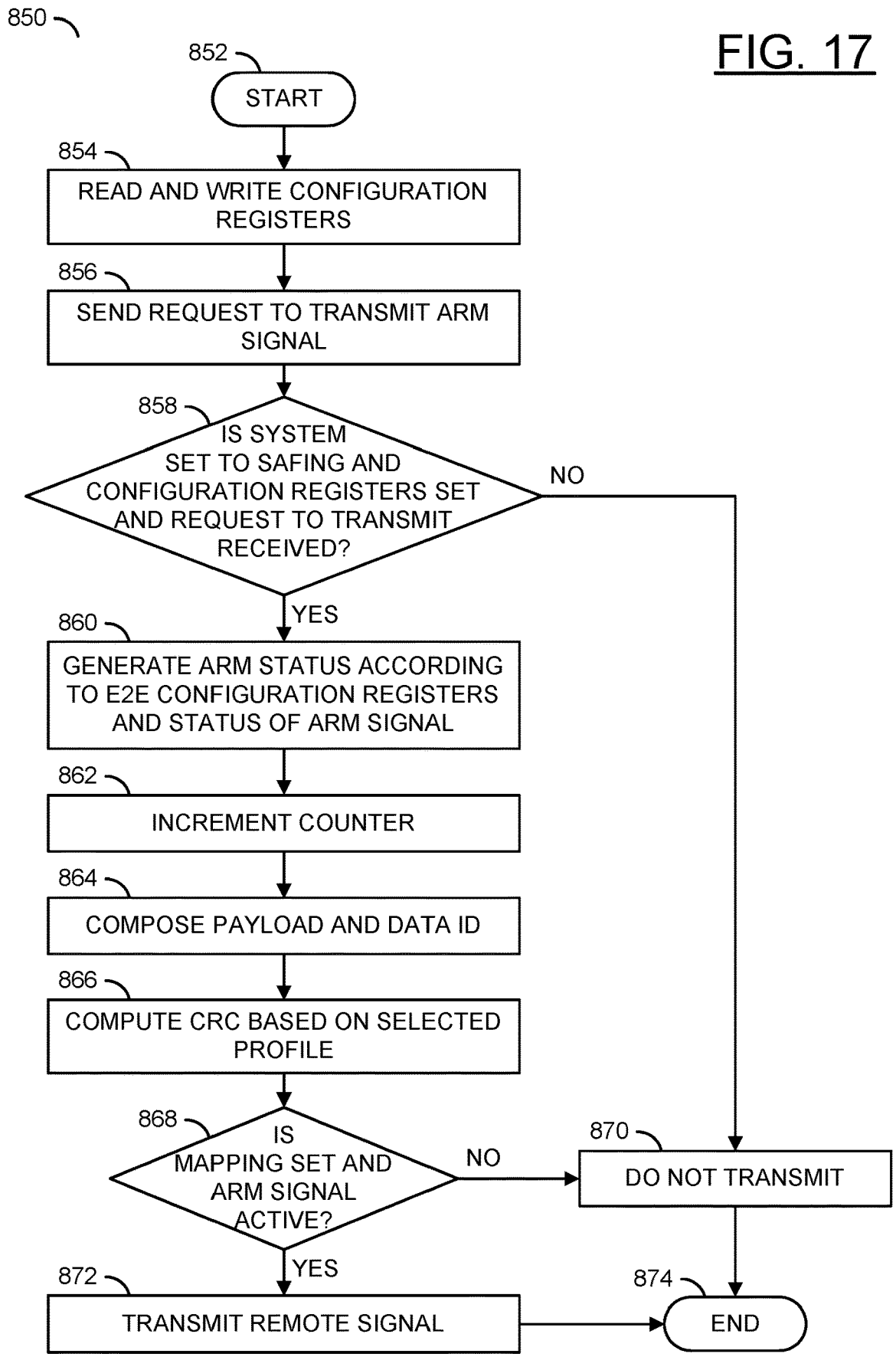
FIG. 17 is a flow diagram illustrating a method for generating an E2E transmit message.

Referring to FIG. 17, a method (or process) 850 is shown. The method 850 may generate an E2E transmit message. The method 850 generally comprises a step (or state) 852, a step (or state) 854, a step (or state) 856, a decision step (or state) 858, a step (or state) 860, a step (or state) 862, a step (or state) 864, a step (or state) 866, a decision step (or state) 868, a step (or state) 870, a step (or state) 872, and a step (or state) 874.

The step 852 may start the method 850. In the step 854, the microcontroller 66 may read and write the configuration register sets 120*a*-120*n*. When the configuration is completed, the microcontroller 66 may enable the transmit function and may send the E2E transmit requests. Next, in the step 856, the microcontroller 66 may send the send a request to transmit the arm signal (e.g., the microcontroller 66 may send a RD_E2E_TX_ARM command in order to request the generated TX message). Next, the method 850 may move to the decision step 858.

In the decision step 858, the E2E module 100 may determine the conditions for whether the control unit 60 is set to safing, the configuration register sets 120*a*-120*n* are set and a request to transmit has been received. If all the conditions are not met, then the method 850 may move to the step 870. If all the conditions are met, then the method 850 may move to the step 860. In the step 860, the E2E module 100 may generate the TX arm status. The TX arm status may be generated according to the configuration register sets 120*a*-120*n* (e.g., active bits and mapping bits) and/or the status of the arm signal A (e.g., the arm result circuit 414). Next, the method 850 may move to the step 862 (e.g., perform the arm transmit validation).

In the step 862, the request arm transmit module 116*c* and/or the request arm transmit module 116*e* may increment the rolling counter. The rolling counter may be incremented with every transmission request. Next, in the step 864, the request arm transmit module 116*c* and/or the request arm transmit module 116*e* may compose the data payload and the data ID. The data ID may depend on one or more of the configuration registers 350*a*-350*n* (e.g., an E2E_ARM_DATA_ID_SELECTION register). The data ID may be an element of a predefined set of data IDs (e.g., a value of the counter as an index to select the particular data ID used for protection) or the data ID may be written in a DATA_ID_VALUE register. Once the payload is ready (e.g., the counter is implemented, the arm status is determined and the data ID is set), the CRC may be computed. In the step 866, the request arm transmit module 116*c* and/or the request arm transmit module 116*e* may compute the CRC based on the configured profile. Next, the method 850 may move to the decision step 868.

In the decision step 868, the E2E module 100 may determine whether the mapping has been set and if the arm signal A is active. If the mapping has not been set or the arm signal A is not active, then the method 850 may move to the step 870. In the step 870, the transmit request (e.g., the signal REM) may not be transmitted. Next, the method 850 may move to the step 874. In the decision step 868, if the mapping has been set and the arm signal A is active, then the E2E module 100 may transmit the remote signal REM. Next, the method 850 may move to the step 874. The step 874 may end the method 850.

Figure 18:
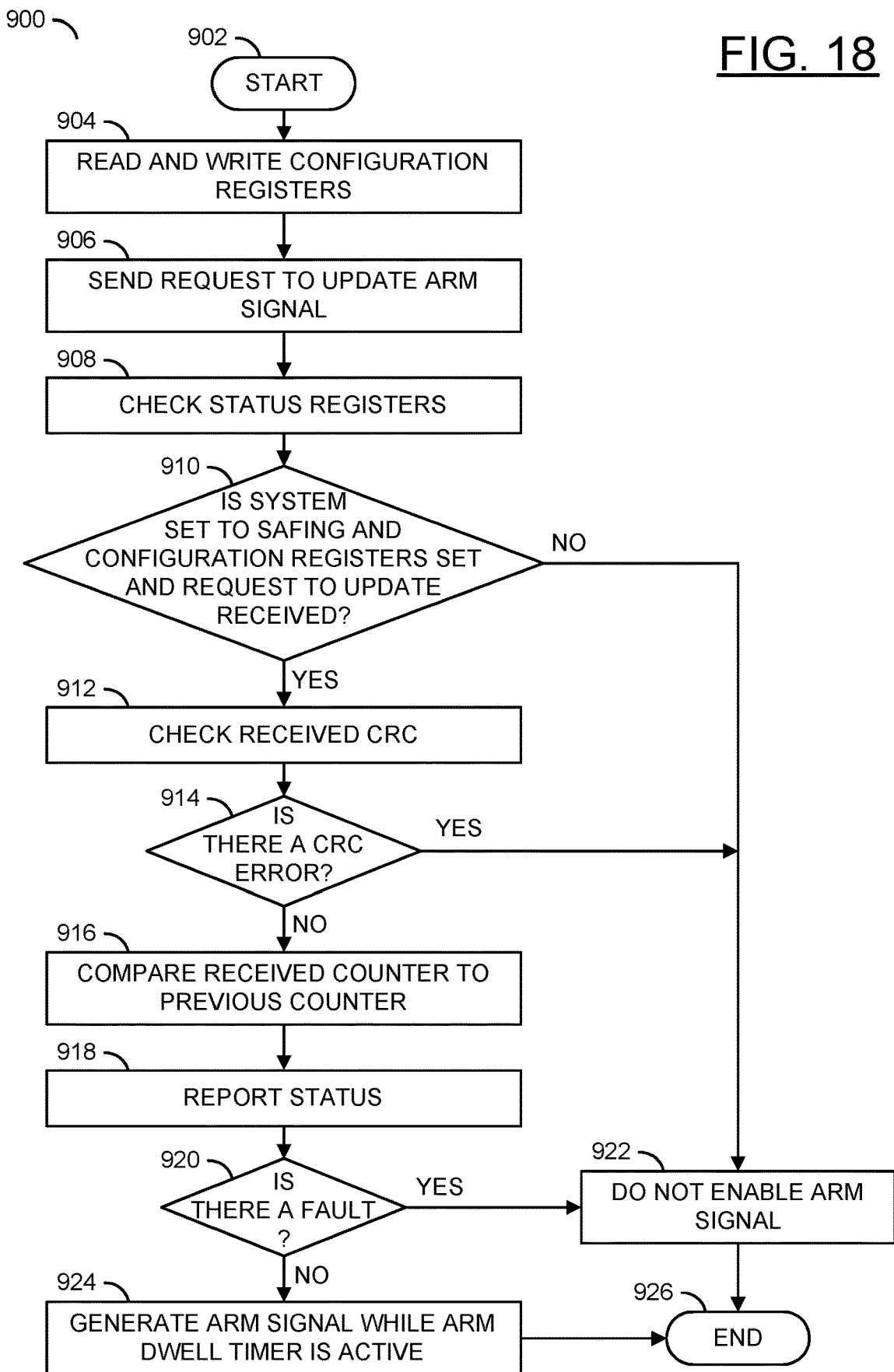
FIG. 18 is a flow diagram illustrating a method for validating a received E2E message.

Referring to FIG. 18, a method (or process) 900 is shown. The method 900 may validate a received E2E message. The method 900 generally comprises a step (or state) 902, a step (or state) 904, a step (or state) 906, a step (or state) 908, a decision step (or state) 910, a step (or state) 912, a decision step (or state) 914, a step (or state) 916, a step (or state) 918, a decision step (or state) 920, a step (or state) 922, a step (or state) 924, and a step (or state) 926.

The step 902 may start the method 900. In the step 904, the microcontroller 66 may read and write the configuration register sets 120*a*-120*n*. When the configuration is completed, the microcontroller 66 may enable the receive function and may send the update arm signal requests. Next, in the step 906, the microcontroller 66 may send the send a request to update the arm signal (e.g., the microcontroller 66 may send a UPDATE_E2E_ARM_ST command). In the step 908, the microcontroller 66 may check the status register sets 122*a*-122*n* (e.g., the microcontroller 66 may send the NOP command). Next, the method 900 may move to the decision step 910.

In the decision step 910, the E2E module 100 may determine the conditions for whether the control unit 60 is set to safing, the configuration register sets 120*a*-120*n* are set and a request to update has been received. If all the conditions are not met, then the method 900 may move to the step 922. If all the conditions are met, then the method 900 may move to the step 912. In the step 912, the payload extraction module 114d may check the received CRC. The CRC may be checked according to the selected profile. Next, the method 900 may move to the decision step 914.

In the decision step 914, the payload extraction module 114d may determine whether there is a CRC error. If there is a CRC error, then the method 900 may move to the step 922. If there is not a CRC error, then the method 900 may move to the step 916. In the step 916, the payload extraction module 114d may compare the received counter value to the previous counter value. For a first access the status bits and last counter may be assigned to RX_counter in order to synchronize for the following messages. After the initialization phase is completed, for every update access, the counter of the received data may be compared against the counter of the previously received data in order to compute the counter delta. Next, in the step 918, the payload extraction module 114d may report the status of the counter. Next, the method 900 may move to the decision step 920.

In the decision step 920, the payload extraction module 114d may determine whether there is a fault. For example, if the counter delta is zero, then no new data has arrived, or the data is repeated. In another example, if the counter delta is one, then no data has been lost. In yet another example, if the counter delta is more than one, but within allowed limits, then some data may be lost. In still another example, if the counter delta is more than one and more than the allowed limits then too much data may have been lost. If there is a fault, then the method 900 may move to the step 922. In the step 922, the E2E module 100 may not enable the bypass signal B to be presented to the safing block 70 for use as the arm signal A. Next, the method 900 may move to the step 926. In the decision step 920, if there is no fault, then the method 900 may move to the step 924. In the step 924, the E2E module 100 may generate the bypass signal B for the safing block 70 to use as the arm signal A while the arm dwell timer is active. Next, the method 900 may move to the step 926. The step 926 may end the method 900.

The functions performed by the diagrams of FIGS. 1-18 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   communication logic configured to (i) receive a data payload from a bus, (ii) validate said data payload, (iii) decode an instruction from said data payload, (iv) generate a bypass signal in response to said instruction and (v) generate a remote signal in response to an arm signal; and
   a memory configured to (i) store configuration data and (ii) store status information, wherein
      (i) said bypass signal is compatible with a safing block configured to provide one independent signal for activating an actuator,
      (ii) validating said data payload ensures an integrity of said instruction received from a remote source,
      (iii) said communication logic operates according to a pre-defined end-to-end communication standard,
      (iv) said configuration data is configured to enable a selected profile from a plurality of profiles for said pre-defined end-to-end communication standard,
      (v) said safing block is configured to pass through said bypass signal generated by said communication logic as said arm signal, and
      (vi) said communication logic receives said arm signal from said safing block.

2. The apparatus according to claim 1, wherein said apparatus is configured to implement hardware logic for an end-to-end communication protocol.

3. The apparatus according to claim 1, wherein said apparatus is implemented as an integrated circuit of an application specific integrated controller of an electronic control unit.

4. The apparatus according to claim 3, wherein said electronic control unit is implemented in a vehicle.

5. The apparatus according to claim 1, wherein said communication logic comprises (i) an address extraction module, (ii) a data extraction module, (iii) a validation module, (iv) a code extraction module and (v) a payload extraction module.

6. The apparatus according to claim 5, wherein (i) said address extraction module is configured to determine an address of said memory from said data payload for a read/write operation and (ii) said data extraction module is configured to extract data from said data payload for said read/write operation.

7. The apparatus according to claim 5, wherein said validation module is configured to validate said data payload before said instruction is decoded by said code extraction module.

8. The apparatus according to claim 7, wherein an arm update is enabled in response to (i) said code extraction module generating an enable signal and (ii) said payload extraction module provides (a) an error check, (b) a counter and (c) an arm status from said data payload.

9. The apparatus according to claim 1, wherein one of said plurality of profiles is configured to enable a standard deployment of said safing block without using said pre-defined end-to-end communication standard.

10. The apparatus according to claim 1, wherein said plurality of profiles are configured to enable said apparatus to communicate with said remote source that supports one of said plurality of profiles.

11. The apparatus according to claim 1, wherein said configuration data is configured to enable said communication logic to transmit said data payload to said remote source over said bus in a transmit mode of operation and receive said data payload from said remote source over said bus in a receive mode of operation.

12. The apparatus according to claim 1, wherein said configuration data and said status information are stored in a register map.

13. The apparatus according to claim 12, wherein based on an arrangement of data stored, said register map is configured to (i) disable a reception of an arm request and a transmission of an arm request using said bypass signal, (ii) enable said reception of said arm request and disable said transmission of said arm request using said bypass signal, (iii) disable said reception of said arm request and enable said transmission of said arm request using said bypass signal and (iv) enable said reception of said arm request and enable said transmission of said arm request using said bypass signal.

14. The apparatus according to claim 12, wherein based on an arrangement of data stored, said register map is configured to map said arm signal generated by said communication logic to a physical arm signal based on a configuration matrix.

15. The apparatus according to claim 12, wherein based on an arrangement of data stored, said register map enables a configuration of a data identity used for said plurality of profiles.

16. The apparatus according to claim 12, wherein based on an arrangement of data stored, said register map enables a configuration of an arm dwell time.

17. The apparatus according to claim 1, wherein (i) said safing block is configured to present said arm signal to said communication logic, a logic gate and control logic, (ii) said logic gate is configured to enable a transistor for generating an activation signal for said actuator and (iii) said control logic is configured to enable said transistor for generating said activation signal for said actuator in response to an independently generated deploy signal.

* * * * *